United States Patent
Luo et al.

(10) Patent No.: US 10,547,533 B2
(45) Date of Patent: Jan. 28, 2020

(54) SERVICE DISTRIBUTION OBTAINING METHOD, APPARATUS, AND SYSTEM

(71) Applicant: Huawei Technologies Co., Ltd., Shenzhen (CN)

(72) Inventors: Zezhou Luo, Shenzhen (CN); Hongcheng Zhuang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 188 days.

(21) Appl. No.: 15/607,044

(22) Filed: May 26, 2017

(65) Prior Publication Data

US 2017/0264517 A1   Sep. 14, 2017

Related U.S. Application Data

(63) Continuation of application No. PCT/CN2014/092589, filed on Nov. 28, 2014.

(51) Int. Cl.
*G06F 15/173* (2006.01)
*H04L 12/26* (2006.01)
*H04L 12/24* (2006.01)

(52) U.S. Cl.
CPC ...... *H04L 43/0876* (2013.01); *H04L 43/0894* (2013.01); *H04L 41/024* (2013.01); *H04L 43/062* (2013.01)

(58) Field of Classification Search
CPC . H04L 41/024; H04L 43/062; H04L 43/0876; H04L 43/0894; H04W 28/00
See application file for complete search history.

(56) References Cited

U.S. PATENT DOCUMENTS

| 6,650,731 | B1 | 11/2003 | Steltner et al. | |
|---|---|---|---|---|
| 2006/0182067 | A1* | 8/2006 | Rinne | H04W 16/02 370/335 |
| 2010/0069064 | A1* | 3/2010 | Hannu | H04W 72/005 455/434 |
| 2010/0234031 | A1 | 9/2010 | Lidron | |

(Continued)

FOREIGN PATENT DOCUMENTS

| CN | 102612046 A | 7/2012 |
|---|---|---|
| CN | 103716799 A | 4/2014 |

(Continued)

*Primary Examiner* — Tonia L Dollinger
*Assistant Examiner* — Dixon F Dabipi
(74) *Attorney, Agent, or Firm* — Slater Matsil, LLP

(57) ABSTRACT

A service distribution obtaining method, a network side device, and a terminal are provided in this disclosure. The method includes: obtaining, by a network side device, measurement information of multiple terminals in a serving cell and an average service volume of each of the multiple terminals, and determining service distribution, where the measurement information includes first channel state values of channels between the multiple terminals and a primary cell, the primary cell refers to the serving cell or one of neighboring cells of the serving cell, the service distribution includes a first typical channel state value of each type of the first channel state values and a first service volume between a terminal set corresponding to each type of the first channel state values and the primary cell, and the first service volume is determined according to the average service volume of each terminal.

18 Claims, 14 Drawing Sheets

(56) References Cited

U.S. PATENT DOCUMENTS

| | | | |
|---|---|---|---|
| 2012/0089845 A1* | 4/2012 | Raleigh | H04L 12/14 713/176 |
| 2012/0129566 A1 | 5/2012 | Lee et al. | |
| 2012/0231830 A1* | 9/2012 | Jeong | H04W 48/12 455/513 |
| 2014/0140213 A1* | 5/2014 | Raleigh | H04L 67/2804 370/235 |
| 2015/0208246 A1 | 7/2015 | Zhuang | |
| 2016/0050571 A1 | 2/2016 | Zhuang et al. | |

FOREIGN PATENT DOCUMENTS

| | | |
|---|---|---|
| EP | 2031922 A2 | 3/2009 |
| JP | 2007053679 A | 3/2007 |
| WO | 2009053375 A1 | 4/2009 |
| WO | 2014176769 A1 | 11/2014 |

* cited by examiner

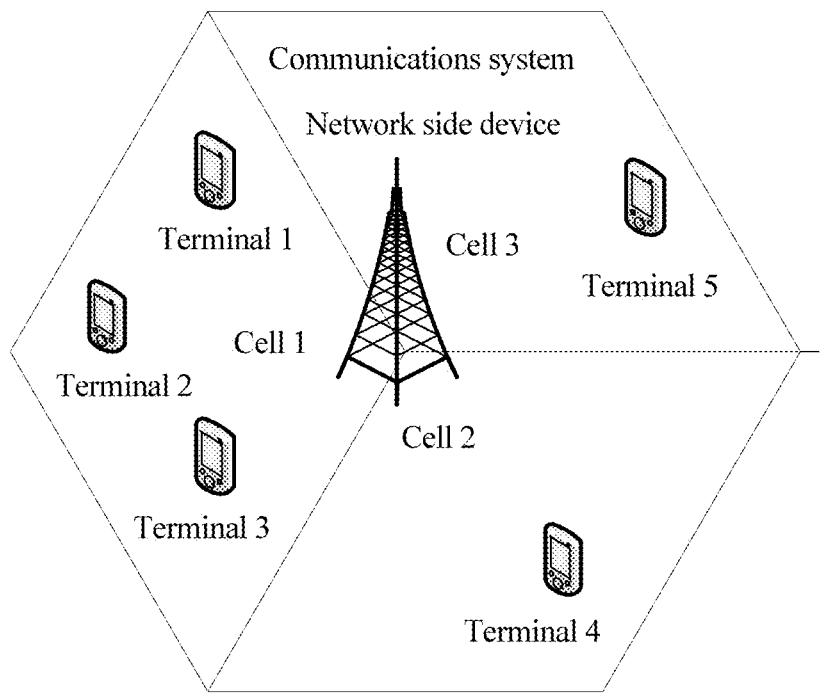

FIG. 1

```
┌─────────────────────────────────────────────────────────────┐
│ A network side device obtains measurement information of    │
│ multiple terminals in a serving cell, where the measurement │── S101
│ information includes first channel state values of channels │
│ between the multiple terminals and a primary cell, and the  │
│ primary cell refers to the serving cell or one of           │
│ neighboring cells of the serving cell                       │
└─────────────────────────────────────────────────────────────┘
                              │
                              ▼
┌─────────────────────────────────────────────────────────────┐
│ The network side device obtains an average service volume   │── S102
│ of each of the multiple terminals                           │
└─────────────────────────────────────────────────────────────┘
                              │
                              ▼
┌─────────────────────────────────────────────────────────────┐
│ The network side device classifies the first channel state  │── S103
│ values                                                      │
└─────────────────────────────────────────────────────────────┘
                              │
                              ▼
┌─────────────────────────────────────────────────────────────┐
│ The network side device determines service distribution,    │
│ where the service distribution includes a first typical     │
│ channel state value of each type of the first channel state │── S104
│ values and a first service volume between a terminal set    │
│ corresponding to each type of the first channel state values│
│ and the primary cell, and the first service volume is       │
│ determined according to the average service volume of each  │
│ terminal                                                    │
└─────────────────────────────────────────────────────────────┘
```

FIG. 2

SERVICE DISTRIBUTION OBTAINING METHOD, APPARATUS, AND SYSTEM

CROSS-REFERENCE TO RELATED APPLICATIONS

This application is a continuation of International Application No. PCT/CN2014/092589, filed on Nov. 28, 2014, the disclosure of which is hereby incorporated by reference in its entirety.

TECHNICAL FIELD

The present invention relates to the field of communications technologies, and in particular, to a service distribution obtaining method, an apparatus, and a system.

BACKGROUND

With continuous development of network technologies, user service distribution (hereinafter referred to as service distribution) in a network is being applied to the network technologies widely increasingly. For example, service distribution is most basic reference information in a network optimization technology. The network optimization technology means adjusting a transmission parameter, such as a transmit power or transmission duration, of a network according to service distribution in the network, so that an adjusted transmission parameter of the network can be suitable for the service distribution in the network. The service distribution refers to geographical distribution of a service in the network, that is, a correspondence between the service and geographical location information of a terminal that bears the service.

Currently, a base station may obtain geographical location information of a terminal in a coverage area of the base station to obtain service distribution in the coverage area of the base station. There are generally two manners of obtaining geographical location information of a terminal by a base station. In one manner, multiple base stations respectively measure distances between a terminal and the multiple base stations, and use the distances between the terminal and the multiple base stations as geographical location information of the terminal, so that the base stations obtain service distribution according to the geographical location information. In the other manner, a terminal obtains longitude and latitude coordinates of the terminal by using a positioning function of the terminal, for example, the Global Positioning System (GPS), and reports the longitude and latitude coordinates to a base station; and the base station uses the longitude and latitude coordinates of the terminal as geographical location information of the terminal, so that the base station obtains service distribution according to the geographical location information.

However, on one hand, when multiple base stations measure distances between a terminal and the multiple base stations to obtain service distribution, a large amount of air interface data is generated because the multiple base stations need to respectively measure the distances between the terminal and the multiple base stations, thereby reducing network efficiency. On the other hand, when a base station obtains service distribution by using a positioning function of a terminal, because some terminals disable their positioning functions of the terminals or do not provide a positioning function, the base station cannot obtain geographical location information of these terminals, and the base station cannot obtain service distribution of all terminals in a coverage area of the base station.

SUMMARY

Embodiments of the present invention provide a service distribution obtaining method, an apparatus, and a system, so that a base station can obtain service distribution of all terminals in a coverage area of the base station without affecting network efficiency.

To achieve the foregoing objective, the following technical solutions are used in the present invention:

According to a first aspect, embodiments provide a service distribution obtaining method. The method includes: obtaining, by a network side device, measurement information of multiple terminals in a serving cell, where the measurement information includes first channel state values of channels between the multiple terminals and a primary cell, and the primary cell refers to the serving cell or one of neighboring cells of the serving cell. The method also includes obtaining, by the network side device, an average service volume of each of the multiple terminals. The method also includes classifying, by the network side device, the first channel state values. The method also includes determining, by the network side device, service distribution, where the service distribution includes a first typical channel state value of each type of the first channel state values and a first service volume between a terminal set corresponding to each type of the first channel state values and the primary cell, and the first service volume is determined according to the average service volume of each terminal.

In a first possible implementation manner of the first aspect, the measurement information further includes second channel state values of channels between the multiple terminals and secondary cells, the secondary cells are cells, other than the primary cell, in the serving cell and the neighboring cells, and the service distribution further includes: second typical channel state values of channels between the terminal set and the secondary cells and second service volumes between the terminal set and the secondary cells, where the second typical channel state values are determined by the network side device according to the second channel state values, and the second service volumes are determined by the network side device according to the average service volume of each terminal.

With reference to the first aspect or the first possible implementation manner of the first aspect, in a second possible implementation manner of the first aspect, the network side device serves the primary cell, and the obtaining, by a network side device, measurement information of multiple terminals includes: receiving, by the network side device, the measurement information sent by the multiple terminals.

With reference to the second possible implementation manner of the first aspect, in a third possible implementation manner, the network side device serves the primary cell, and before the receiving, by the network side device, the measurement information sent by the multiple terminals, the method further includes: sending, by the network side device, a downlink reference signal to the multiple terminals; and sending, by the network side device, a first measurement trigger instruction to the multiple terminals, where the first measurement trigger instruction is used to instruct the multiple terminals to measure the downlink reference signal.

With reference to the first aspect, in a fourth possible implementation manner of the first aspect, the network side device serves the primary cell, and the obtaining, by a network side device, measurement information of multiple terminals includes: sending, by the network side device, a second measurement trigger instruction to the multiple terminals, where the second measurement trigger instruction is used to instruct the multiple terminals to send uplink reference signals; receiving, by the network side device, the uplink reference signals sent by the multiple terminals; and measuring, by the network side device, the uplink reference signals to obtain the measurement information.

With reference to the first aspect, in a fifth possible implementation manner of the first aspect, the network side device serves the primary cell, and the obtaining, by a network side device, measurement information of multiple terminals includes: receiving, by the network side device, third measurement trigger instructions that are respectively sent by the multiple terminals, where the third measurement trigger instructions are used to: instruct the multiple terminals to send uplink reference signals, and instruct the network side device to measure the uplink reference signals sent by the multiple terminals; receiving, by the network side device, the uplink reference signals sent by the multiple terminals; and measuring, by the network side device, the uplink reference signals to obtain the measurement information.

With reference to the first aspect, in a sixth possible implementation manner of the first aspect, the network side device does not serve the primary cell, and the obtaining, by a network side device, measurement information of multiple terminals includes: receiving, by the network side device, the measurement information sent by a network side device that serves the primary cell.

With reference to the first possible implementation manner of the first aspect, in a seventh possible implementation manner, the measurement information includes first measurement information and second measurement information, where the first measurement information includes channel state values of channels between the multiple terminals and the serving cell, and the second measurement information includes channel state values of channels between the multiple terminals and the neighboring cells; and the obtaining, by a network side device, measurement information of multiple terminals includes: sending, by the network side device, a second measurement trigger instruction to the multiple terminals, where the second measurement trigger instruction is used to instruct the multiple terminals to send uplink reference signals; receiving, by the network side device, the uplink reference signals sent by the multiple terminals; measuring, by the network side device, the uplink reference signals to obtain the first measurement information; and receiving, by the network side device, the second measurement information sent by a network side device that serves the neighboring cells.

With reference to the first possible implementation manner of the first aspect, in an eighth possible implementation manner, the measurement information includes first measurement information and second measurement information, where the first measurement information includes channel state values of channels between the multiple terminals and the serving cell, and the second measurement information includes channel state values of channels between the multiple terminals and the neighboring cells; and the obtaining, by a network side device, measurement information of multiple terminals includes: receiving, by the network side device, third measurement trigger instructions that are respectively sent by the multiple terminals, where the third measurement trigger instructions are used to: instruct the multiple terminals to send uplink reference signals, and instruct the network side device to measure the uplink reference signals sent by the multiple terminals; receiving, by the network side device, the uplink reference signals sent by the multiple terminals; measuring, by the network side device, the uplink reference signals to obtain the first measurement information; and receiving, by the network side device, the second measurement information sent by a network side device that serves the neighboring cells.

With reference to any one of the first aspect, or the first possible implementation manner of the first aspect to the eighth possible implementation manner of the first aspect, in a ninth possible implementation manner, the obtaining, by a network side device, measurement information of multiple terminals includes: after transmission of first air interface data is completed, if the network side device does not detect that second air interface data is transmitted within a preset time, obtaining, by the network side device, the measurement information of the multiple terminals after the preset time.

With reference to the fifth possible implementation manner of the first aspect or the eighth possible implementation manner of the first aspect, in a tenth possible implementation manner, the third measurement trigger instruction is a synchronization request message, and the synchronization request message includes a indicator for requesting to send an uplink reference signal; or the third measurement trigger instruction is a synchronization instruction message, and the synchronization instruction message includes an uplink reference signal sending instruction and a sending timestamp.

According to a second aspect, embodiments provide a service distribution obtaining method. The method includes obtaining, by a network side device, measurement information of multiple terminals, where the measurement information includes first channel state values of channels between the multiple terminals and a primary cell and second channel state values of channels between the multiple terminals and secondary cells, a serving cell of the multiple terminals is the primary cell, and the secondary cells are neighboring cells of the primary cell. The method also includes obtaining, by the network side device, an average service volume of each of the multiple terminals. The method also includes classifying, by the network side device, the first channel state values. The method also includes determining, by the network side device, service distribution, where the service distribution includes second typical channel state values of channels between a terminal set corresponding to each type of the first channel state values and the secondary cells and second service volumes between the terminal set and the secondary cells, the second typical channel state values are determined by the network side device according to the second channel state values, and the second service volumes are determined by the network side device according to the average service volume of each terminal.

In a first possible implementation manner of the second aspect, the measurement information includes first measurement information and second measurement information, where the first measurement information includes the channel state values of the channels between the multiple terminals and the primary cell, and the second measurement information includes the channel state values of the channels between the multiple terminals and the secondary cells; and the obtaining, by a network side device, measurement information of multiple terminals includes: receiving, by the network side device, the first measurement information sent by the multiple terminals; and receiving, by the network side device, the second measurement information sent by a network side device that serves the secondary cells.

With reference to the first possible implementation manner of the second aspect, in a second possible implementation manner, before the receiving, by the network side device, the measurement information sent by the multiple terminals, the method further includes: sending, by the network side device, a downlink reference signal to the multiple terminals; and sending, by the network side device, a first measurement trigger instruction to the multiple terminals, where the first measurement trigger instruction is used to instruct the multiple terminals to measure the downlink reference signal.

With reference to the second aspect, in a third possible implementation manner of the second aspect, the measurement information includes first measurement information and second measurement information, where the first measurement information includes the channel state values of the channels between the multiple terminals and the primary cell, and the second measurement information includes the channel state values of the channels between the multiple terminals and the secondary cells; and the obtaining, by a network side device, measurement information of multiple terminals includes: sending, by the network side device, a second measurement trigger instruction to the multiple terminals, where the second measurement trigger instruction is used to instruct the multiple terminals to send uplink reference signals; receiving, by the network side device, the uplink reference signals sent by the multiple terminals; measuring, by the network side device, the uplink reference signals to obtain the first measurement information; and receiving, by the network side device, the second measurement information sent by a network side device that serves the secondary cells.

With reference to the second aspect, in a fourth possible implementation manner of the second aspect, the measurement information includes first measurement information and second measurement information, where the first measurement information includes the channel state values of the channels between the multiple terminals and the primary cell, and the second measurement information includes the channel state values of the channels between the multiple terminals and the secondary cells; and the obtaining, by a network side device, measurement information of multiple terminals includes: receiving, by the network side device, third measurement trigger instructions that are respectively sent by the multiple terminals, where the third measurement trigger instructions are used to: instruct the multiple terminals to send uplink reference signals, and instruct the network side device to measure the uplink reference signals sent by the multiple terminals; receiving, by the network side device, the uplink reference signals sent by the multiple terminals; measuring, by the network side device, the uplink reference signals to obtain the first measurement information; and receiving, by the network side device, the second measurement information sent by a network side device that serves the secondary cells.

With reference to any one of the second aspect, or the first possible implementation manner of the second aspect to the fourth possible implementation manner of the second aspect, in a fifth possible implementation manner, the obtaining, by a network side device, measurement information of multiple terminals includes: after transmission of first air interface data is completed, if the network side device does not detect that second air interface data is transmitted within a preset time, obtaining, by the network side device, the measurement information of the multiple terminals after the preset time.

According to a third aspect, embodiments provide a service distribution obtaining method. The method includes generating, by a terminal, a terminal measurement trigger instruction, where the terminal measurement trigger instruction is used to instruct the terminal to measure a received downlink reference signal. The method also includes measuring, by the terminal, the downlink reference signal to obtain measurement information of the terminal. The method also includes sending, by the terminal, the measurement information of the terminal to a network side device, so that the network side device obtains service distribution in a serving cell of the terminal according to the measurement information of the terminal and a service transmitted between the terminal and the serving cell, where the network side device serves the terminal.

According to a fourth aspect, embodiments provide a service distribution obtaining method. The method includes generating, by a terminal, a network side measurement trigger instruction, where the network side measurement trigger instruction is used to: instruct the terminal to send an uplink reference signal to multiple network side devices, and instruct the multiple network side devices to measure the uplink reference signal sent by the terminal, and the uplink reference signal is used by the multiple network side devices to obtain measurement information of the terminal, so as to obtain service distribution in a serving cell of the terminal according to the measurement information and a service transmitted between the terminal and the serving cell. The method also includes sending, by the terminal, the network side measurement trigger instruction to the multiple network side devices. The method also includes sending, by the terminal, the uplink reference signal to the multiple network side devices.

In a first possible implementation manner of the fourth aspect, the network side measurement trigger instruction is a synchronization request message, and the synchronization request message includes a indicator for requesting to send an uplink reference signal; or the network side measurement trigger instruction is a synchronization instruction message, and the synchronization instruction message includes an uplink reference signal sending instruction and a sending timestamp.

According to a fifth aspect, embodiments provide a network side device. The device includes an obtaining unit, configured to obtain measurement information of multiple terminals in a serving cell and an average service volume of each of the multiple terminals, where the measurement information includes first channel state values of channels between the multiple terminals and a primary cell, and the primary cell refers to the serving cell or one of neighboring cells of the serving cell. The device also includes a classification unit, configured to classify the first channel state values obtained by the obtaining unit. The device also include a determining unit, configured to determine service distribution, where the service distribution includes a first typical channel state value of each type of the first channel state values obtained by the classification unit by means of classification and a first service volume between a terminal set corresponding to each type of the first channel state values and the primary cell, and the first service volume is determined according to the average service volume of each terminal that is obtained by the obtaining unit.

In a first possible implementation manner of the fifth aspect, the measurement information obtained by the obtaining unit further includes second channel state values of channels between the multiple terminals and secondary cells, the secondary cells are cells, other than the primary cell, in the serving cell and the neighboring cells, and the service distribution determined by the determining unit further includes: second typical channel state values of channels between the terminal set and the secondary cells and second service volumes between the terminal set and the secondary cells, where the second typical channel state values are determined according to the second channel state values obtained by the obtaining unit, and the second service volumes are determined according to the average service volume of each terminal that is obtained by the obtaining unit.

With reference to the fifth aspect or the first possible implementation manner of the fifth aspect, in a second possible implementation manner, the network side device serves the primary cell; and the obtaining unit is specifically configured to receive the measurement information sent by the multiple terminals.

With reference to the second possible implementation manner of the fifth aspect, in a third possible implementation manner, the network side device serves the primary cell, and the network side device further includes: a sending unit, configured to: before the obtaining unit receives the measurement information sent by the multiple terminals, send a downlink reference signal and a first measurement trigger instruction to the multiple terminals, where the first measurement trigger instruction is used to instruct the multiple terminals to measure the downlink reference signal.

With reference to the fifth aspect, in a fourth possible implementation manner of the fifth aspect, the network side device serves the primary cell, and the obtaining unit specifically includes a sending module, a receiving module, and a measurement module; the sending module is configured to send a second measurement trigger instruction to the multiple terminals, where the second measurement trigger instruction is used to instruct the multiple terminals to send uplink reference signals; the receiving module is configured to receive the uplink reference signals sent by the multiple terminals; and the measurement module is configured to measure the uplink reference signals received by the receiving module, to obtain the measurement information.

With reference to the fifth aspect, in a fifth possible implementation manner of the fifth aspect, the network side device serves the primary cell, and the obtaining unit specifically includes a receiving module and a measurement module; the receiving module is configured to receive third measurement trigger instructions and uplink reference signals that are separately sent by the multiple terminals, where the third measurement trigger instructions are used to: instruct the multiple terminals to send the uplink reference signals, and instruct the measurement module to measure the uplink reference signals; and the measurement module is configured to measure the uplink reference signals received by the receiving module, to obtain the measurement information.

With reference to the fifth aspect, in a sixth possible implementation manner of the fifth aspect, the network side device does not serve the primary cell; and the obtaining unit is specifically configured to receive the measurement information sent by a network side device that serves the primary cell.

With reference to the first possible implementation manner of the fifth aspect, in a seventh possible implementation manner, the measurement information obtained by the obtaining unit includes first measurement information and second measurement information, where the first measurement information includes channel state values of channels between the multiple terminals and the serving cell, the second measurement information includes channel state values of channels between the multiple terminals and the neighboring cells, and the obtaining unit specifically includes a sending module, a receiving module, and a measurement module; the sending module is configured to send a second measurement trigger instruction to the multiple terminals, where the second measurement trigger instruction is used to instruct the multiple terminals to send uplink reference signals; the receiving module is configured to receive the uplink reference signals sent by the multiple terminals and the second measurement information sent by a network side device that serves the neighboring cells; and the measurement module is configured to measure the uplink reference signals received by the receiving module, to obtain the first measurement information.

With reference to the first possible implementation manner of the fifth aspect, in an eighth possible implementation manner, the measurement information obtained by the obtaining unit includes first measurement information and second measurement information, where the first measurement information includes channel state values of channels between the multiple terminals and the serving cell, the second measurement information includes channel state values of channels between the multiple terminals and the neighboring cells, and the obtaining unit specifically includes a receiving module and a measurement module; the receiving module is configured to receive third measurement trigger instructions that are respectively sent by the multiple terminals, uplink reference signals that are respectively sent by the multiple terminals, and the second measurement information sent by a network side device that serves the neighboring cells, where the third measurement trigger instructions are used to: instruct the multiple terminals to send the uplink reference signals, and instruct the measurement module to measure the uplink reference signals; and the measurement module is configured to measure the uplink reference signals received by the receiving module, to obtain the first measurement information.

With reference to any one of the fifth aspect, or the first possible implementation manner of the fifth aspect to the eighth possible implementation manner of the fifth aspect, in a ninth possible implementation manner, the network side device further includes: a detection unit, configured to: after transmission of first air interface data is completed, detect whether the network side device transmits second air interface data within a preset time, where the obtaining unit is specifically configured to: if the detection unit does not detect that the second air interface data is transmitted within the preset time, obtain the measurement information of the multiple terminals after the preset time.

With reference to the fifth possible implementation manner of the fifth aspect or the eighth possible implementation manner of the fifth aspect, in a tenth possible implementation manner, the third measurement trigger instruction received by the receiving module is a synchronization request message, and the synchronization request message includes a indicator for requesting to send an uplink reference signal; or the third measurement trigger instruction received by the receiving module is a synchronization instruction message, and the synchronization instruction message includes an uplink reference signal sending instruction and a sending timestamp.

According to a sixth aspect, embodiments provide a network side device. The device includes an obtaining unit, configured to obtain measurement information of multiple terminals and an average service volume of each of the multiple terminals, where the measurement information includes first channel state values of channels between the multiple terminals and a primary cell and second channel state values of channels between the multiple terminals and secondary cells, a serving cell of the multiple terminals is the primary cell, and the secondary cells are neighboring cells of the primary cell. The device also includes a classification unit, configured to classify the first channel state values obtained by the obtaining unit. The device also includes a determining unit, configured to determine service distribution, where the service distribution includes second typical channel state values of channels between a terminal set corresponding to each type of the first channel state values obtained by the classification unit by means of classification and the secondary cells and second service volumes between the terminal set and the secondary cells, the second typical channel state values are determined according to the second channel state values obtained by the obtaining unit, and the second service volumes are determined according to the average service volume of each terminal that is obtained by the obtaining unit.

In a first possible implementation manner of the sixth aspect, the measurement information obtained by the obtaining unit includes first measurement information and second measurement information, where the first measurement information includes the channel state values of the channels between the multiple terminals and the primary cell, and the second measurement information includes the channel state values of the channels between the multiple terminals and the secondary cells; and the obtaining unit is specifically configured to receive the first measurement information sent by the multiple terminals and the second measurement information sent by a network side device that serves the secondary cells.

With reference to the first possible implementation manner of the sixth aspect, in a second possible implementation manner of the sixth aspect, the network side device further includes: a sending unit, configured to: before the obtaining unit receives the first measurement information sent by the multiple terminals, send a downlink reference signal and a first measurement trigger instruction to the multiple terminals, where the first measurement trigger instruction is used to instruct the multiple terminals to measure the downlink reference signal.

With reference to the sixth aspect, in a third possible implementation manner of the sixth aspect, the measurement information obtained by the obtaining unit includes first measurement information and second measurement information, where the first measurement information includes the channel state values of the channels between the multiple terminals and the primary cell, the second measurement information includes the channel state values of the channels between the multiple terminals and the secondary cells, and the obtaining unit specifically includes a sending module, a receiving module, and a measurement module; the sending module is configured to send a second measurement trigger instruction to the multiple terminals, where the second measurement trigger instruction is used to instruct the multiple terminals to send uplink reference signals; the receiving module is configured to receive the uplink reference signals sent by the multiple terminals and the second measurement information sent by a network side device that serves the secondary cells; and the measurement module is configured to measure the uplink reference signals received by the receiving module, to obtain the first measurement information.

With reference to the sixth aspect, in a fourth possible implementation manner of the sixth aspect, the measurement information obtained by the obtaining unit includes first measurement information and second measurement information, where the first measurement information includes the channel state values of the channels between the multiple terminals and the primary cell, the second measurement information includes the channel state values of the channels between the multiple terminals and the secondary cells, and the obtaining unit specifically includes a receiving module and a measurement module; the receiving module is configured to receive third measurement trigger instructions that are respectively sent by the multiple terminals, the uplink reference signals sent by the multiple terminals, and the second measurement information sent by a network side device that serves the secondary cells, where the third measurement trigger instructions are used to: instruct the multiple terminals to send the uplink reference signals, and instruct the measurement module to measure the uplink reference signals; and the measurement module is configured to measure the uplink reference signals received by the receiving module, to obtain the first measurement information.

With reference to any one of the sixth aspect, or the first possible implementation manner of the sixth aspect to the fourth possible implementation manner of the sixth aspect, in a fifth possible implementation manner, the network side device further includes: a detection unit, configured to: after transmission of first air interface data is completed, detect whether the network side device transmits second air interface data within a preset time, where the obtaining unit is specifically configured to: if the detection unit does not detect that the second air interface data is transmitted within the preset time, obtain the measurement information of the multiple terminals after the preset time.

According to a seventh aspect, embodiments provide a terminal. The terminal includes a generation unit, configured to generate a terminal measurement trigger instruction, where the terminal measurement trigger instruction is used to instruct a measurement unit to measure a received downlink reference signal. The terminal also includes the measurement unit, configured to measure the downlink reference signal to obtain measurement information of the terminal. The terminal also includes the sending unit, configured to send, to a network side device, the measurement information of the terminal that is obtained by the measurement unit, so that the network side device obtains service distribution in a serving cell of the terminal according to the measurement information of the terminal and a service transmitted between the terminal and the serving cell, where the network side device serves the terminal.

According to an eighth aspect, the present invention provides a terminal, including: a generation unit, configured to generate a network side measurement trigger instruction, where the network side measurement trigger instruction is used to instruct a sending unit to send an uplink reference signal to multiple network side devices, and instruct the multiple network side devices to measure the uplink reference signal, and the uplink reference signal is used by the multiple network side devices to obtain measurement information of the terminal, so as to obtain service distribution in a serving cell of the terminal according to the measurement information and a service transmitted between the terminal and the serving cell; and the sending unit, configured to send the network side measurement trigger instruction generated by the generation unit and the uplink reference signal to the multiple network side devices.

In a first possible implementation manner of the eighth aspect, the network side measurement trigger instruction generated by the generation unit is a synchronization request message, and the synchronization request message includes a indicator for requesting to send an uplink reference signal; or the network side measurement trigger instruction generated by the generation unit is a synchronization instruction message, and the synchronization instruction message includes an uplink reference signal sending instruction and a sending timestamp.

According to a ninth aspect, embodiments provides a network side device. The device also includes a processor, configured to: obtain measurement information of multiple terminals in a serving cell and an average service volume of each of the multiple terminals, classify first channel state values of channels between the multiple terminals and a primary cell, and determine service distribution, where the measurement information includes the first channel state values, the primary cell refers to the serving cell or one of neighboring cells of the serving cell, the service distribution includes a first typical channel state value of each type of the first channel state values and a first service volume between a terminal set corresponding to each type of the first channel state values and the primary cell, and the first service volume is determined according to the average service volume of each terminal.

In a first possible implementation manner of the ninth aspect, the measurement information obtained by the processor further includes second channel state values of channels between the multiple terminals and secondary cells, the secondary cells are cells, other than the primary cell, in the serving cell and the neighboring cells, and the service distribution determined by the processor further includes: second typical channel state values of channels between the terminal set and the secondary cells and second service volumes between the terminal set and the secondary cells, where the second typical channel state values are determined according to the second channel state values, and the second service volumes are determined according to the average service volume of each terminal.

With reference to the ninth aspect or the first possible implementation manner of the ninth aspect, in a second possible implementation manner, the network side device serves the primary cell; and the processor is specifically configured to receive the measurement information sent by the multiple terminals.

With reference to the second possible implementation manner of the ninth aspect, in a third possible implementation manner, the network side device serves the primary cell, and the network side device further includes: a transceiver, configured to: before the processor receives the measurement information sent by the multiple terminals, send a downlink reference signal and a first measurement trigger instruction to the multiple terminals, where the first measurement trigger instruction is used to instruct the multiple terminals to measure the downlink reference signal.

With reference to the ninth aspect, in a fourth possible implementation manner of the ninth aspect, the network side device serves the primary cell; and the processor is specifically configured to: send a second measurement trigger instruction to the multiple terminals, receive uplink reference signals sent by the multiple terminals, and measure the uplink reference signals to obtain the measurement information, where the second measurement trigger instruction is used to instruct the multiple terminals to send the uplink reference signals.

With reference to the ninth aspect, in a fifth possible implementation manner of the ninth aspect, the network side device serves the primary cell; and the processor is specifically configured to: receive third measurement trigger instructions and uplink reference signals that are separately sent by the multiple terminals, and measure the uplink reference signals to obtain the measurement information, where the third measurement trigger instructions are used to: instruct the multiple terminals to send the uplink reference signals, and instruct the processor to measure the uplink reference signals.

With reference to the ninth aspect, in a sixth possible implementation manner of the ninth aspect, the network side device does not serve the primary cell; and the processor is specifically configured to receive the measurement information sent by a network side device that serves the primary cell.

With reference to the ninth aspect, in a seventh possible implementation manner of the ninth aspect, the measurement information obtained by the processor includes first measurement information and second measurement information, where the first measurement information includes channel state values of channels between the multiple terminals and the serving cell, and the second measurement information includes channel state values of channels between the multiple terminals and the neighboring cells; and the processor is specifically configured to: send a second measurement trigger instruction to the multiple terminals, receive uplink reference signals sent by the multiple terminals and the second measurement information sent by a network side device that serves the neighboring cells, and measure the uplink reference signals to obtain the first measurement information, where the second measurement trigger instruction is used to instruct the multiple terminals to send the uplink reference signals.

With reference to the first possible implementation manner of the ninth aspect, in an eighth possible implementation manner, the measurement information obtained by the processor includes first measurement information and second measurement information, where the first measurement information includes channel state values of channels between the multiple terminals and the serving cell, and the second measurement information includes channel state values of channels between the multiple terminals and the neighboring cells; and the processor is specifically configured to: receive third measurement trigger instructions that are respectively sent by the multiple terminals, uplink reference signals that are respectively sent by the multiple terminals, and the second measurement information sent by a network side device that serves the neighboring cells, and measure the uplink reference signals to obtain the first measurement information, where the third measurement trigger instructions are used to: instruct the multiple terminals to send the uplink reference signals, and instruct the processor to measure the uplink reference signals.

With reference to any one of the ninth aspect, or the first possible implementation manner of the ninth aspect to the eighth possible implementation manner of the ninth aspect, in a ninth possible implementation manner, the processor is specifically configured to: after transmission of first air interface data is completed, if the processor does not detect that second air interface data is transmitted within a preset time, obtain the measurement information of the multiple terminals after the preset time.

With reference to the fifth possible implementation manner of the ninth aspect or the eighth possible implementation manner of the ninth aspect, in a tenth possible implementation manner, the third measurement trigger instruction received by the processor is a synchronization request message, and the synchronization request message includes a indicator for requesting to send an uplink reference signal; or the third measurement trigger instruction received by the processor is a synchronization instruction message, and the synchronization instruction message includes an uplink reference signal sending instruction and a sending timestamp.

According to a tenth aspect, embodiments provide a network side device. The device includes a processor, configured to: obtain measurement information of multiple terminals and an average service volume of each of the multiple terminals, classify first channel state values of channels between the multiple terminals and a primary cell, and determine service distribution, where the measurement information includes the first channel state values and second channel state values of channels between the multiple terminals and secondary cells, a serving cell of the multiple terminals is the primary cell, the secondary cells are neighboring cells of the primary cell, the service distribution includes second typical channel state values of channels between a terminal set corresponding to each type of the first channel state values and the secondary cells and second service volumes between the terminal set and the secondary cells, the second typical channel state values are determined according to the second channel state values, and the second service volumes are determined according to the average service volume of each terminal.

In a first possible implementation manner of the tenth aspect, the measurement information obtained by the processor includes first measurement information and second measurement information, where the first measurement information includes the channel state values of the channels between the multiple terminals and the primary cell, and the second measurement information includes the channel state values of the channels between the multiple terminals and the secondary cells; and the processor is specifically configured to receive the first measurement information sent by the multiple terminals and the second measurement information sent by a network side device that serves the secondary cells.

With reference to the first possible implementation manner of the tenth aspect, in a second possible implementation manner, the network side device further includes: a transceiver, configured to: before the processor receives the first measurement information sent by the multiple terminals, send a downlink reference signal and a first measurement trigger instruction to the multiple terminals, where the first measurement trigger instruction is used to instruct the multiple terminals to measure the downlink reference signal.

With reference to the tenth aspect, in a third possible implementation manner of the tenth aspect, the measurement information obtained by the processor includes first measurement information and second measurement information, where the first measurement information includes the channel state values of the channels between the multiple terminals and the primary cell, and the second measurement information includes the channel state values of the channels between the multiple terminals and the secondary cells; and the processor is specifically configured to: send a second measurement trigger instruction to the multiple terminals, receive uplink reference signals sent by the multiple terminals and the second measurement information sent by a network side device that serves the secondary cells, and measure the uplink reference signals to obtain the first measurement information, where the second measurement trigger instruction is used to instruct the multiple terminals to send the uplink reference signals.

With reference to the tenth aspect, in a fourth possible implementation manner of the tenth aspect, the measurement information obtained by the processor includes first measurement information and second measurement information, where the first measurement information includes the channel state values of the channels between the multiple terminals and the primary cell, and the second measurement information includes the channel state values of the channels between the multiple terminals and the secondary cells; and the processor is specifically configured to: receive third measurement trigger instructions that are respectively sent by the multiple terminals, uplink reference signals sent by the multiple terminals, and the second measurement information sent by a network side device that serves the secondary cells, and measure the uplink reference signals to obtain the first measurement information, where the third measurement trigger instructions are used to: instruct the multiple terminals to send the uplink reference signals, and instruct the processor to measure the uplink reference signals.

With reference to the tenth aspect or the first possible implementation manner of the tenth aspect to the fourth possible implementation manner of the tenth aspect, in a fifth possible implementation manner, the processor is specifically configured to: after transmission of first air interface data is completed, if the processor does not detect that second air interface data is transmitted within a preset time, obtain the measurement information of the multiple terminals after the preset time.

According to an eleventh aspect, embodiments provide a terminal. The terminal includes a processor, configured to: generate a terminal measurement trigger instruction, and measure a received downlink reference signal to obtain measurement information of the terminal, where the terminal measurement trigger instruction is used to instruct the processor to measure the downlink reference signal. The terminal also includes a transceiver, configured to send, to a network side device, the measurement information of the terminal that is obtained by the processor, so that the network side device obtains service distribution in a serving cell of the terminal according to the measurement information of the terminal and a service transmitted between the terminal and the serving cell, where the network side device serves the terminal.

According to a twelfth aspect, the embodiments provide a terminal. The terminal includes a processor, configured to generate a network side measurement trigger instruction, where the network side measurement trigger instruction is used to: instruct a transceiver to send an uplink reference signal to multiple network side devices, and instruct the multiple network side devices to measure the uplink reference signal, and the uplink reference signal is used by the multiple network side devices to obtain measurement information of the terminal, so as to obtain service distribution in a serving cell of the terminal according to the measurement information and a service transmitted between the terminal and the serving cell. The terminal also includes the transceiver, configured to send the network side measurement trigger instruction generated by the processor and the uplink reference signal to the multiple network side devices.

In a first possible implementation manner of the twelfth aspect, the network side measurement trigger instruction generated by the processor is a synchronization request message, and the synchronization request message includes a indicator for requesting to send an uplink reference signal; or the network side measurement trigger instruction generated by the processor is a synchronization instruction message, and the synchronization instruction message includes an uplink reference signal sending instruction and a sending timestamp.

According to a thirteenth aspect, embodiments provide a communications system. The communication system includes the network side device according to the fifth aspect and multiple terminals according to the seventh aspect or multiple terminals according to the eighth aspect; or the network side device according to the sixth aspect and multiple terminals according to the seventh aspect or multiple terminals according to the eighth aspect; or the network side device according to the ninth aspect and multiple terminals according to the eleventh aspect or multiple terminals according to the twelfth aspect; or the network side device according to the tenth aspect and multiple terminals according to the eleventh aspect or multiple terminals according to the twelfth aspect.

The embodiments of the present invention provide a service distribution obtaining method, an apparatus, and a system, so that the network side device can obtain distribution of services of multiple terminals in a serving cell in a channel state, that is, the network side device obtains service distribution in the serving cell of the multiple terminals. Compared with service distribution in the prior art, the service distribution provided in the embodiments of the present invention is obtained by measuring channels, classifying and calculating channel measurement results, collecting statistics on services transmitted on the channels, and the like. Therefore, in the service distribution obtaining method provided in the embodiments of the present invention, the network side device can obtain service distribution of all terminals in a network without affecting network efficiency.

BRIEF DESCRIPTION OF THE DRAWINGS

To describe the technical solutions in the embodiments of the present invention, the following briefly introduces the accompanying drawings required for describing the embodiments. Apparently, the accompanying drawings in the following description show some embodiments of the present invention, and a person of ordinary skill in the art may still derive other drawings from these accompanying drawings.

FIG. 1 is a block diagram of a communications system according to an embodiment of the present invention;

FIG. 2 is flowchart 1 of a service distribution obtaining method according to an embodiment of the present invention;

DETAILED DESCRIPTION OF ILLUSTRATIVE EMBODIMENTS

Figure 3:
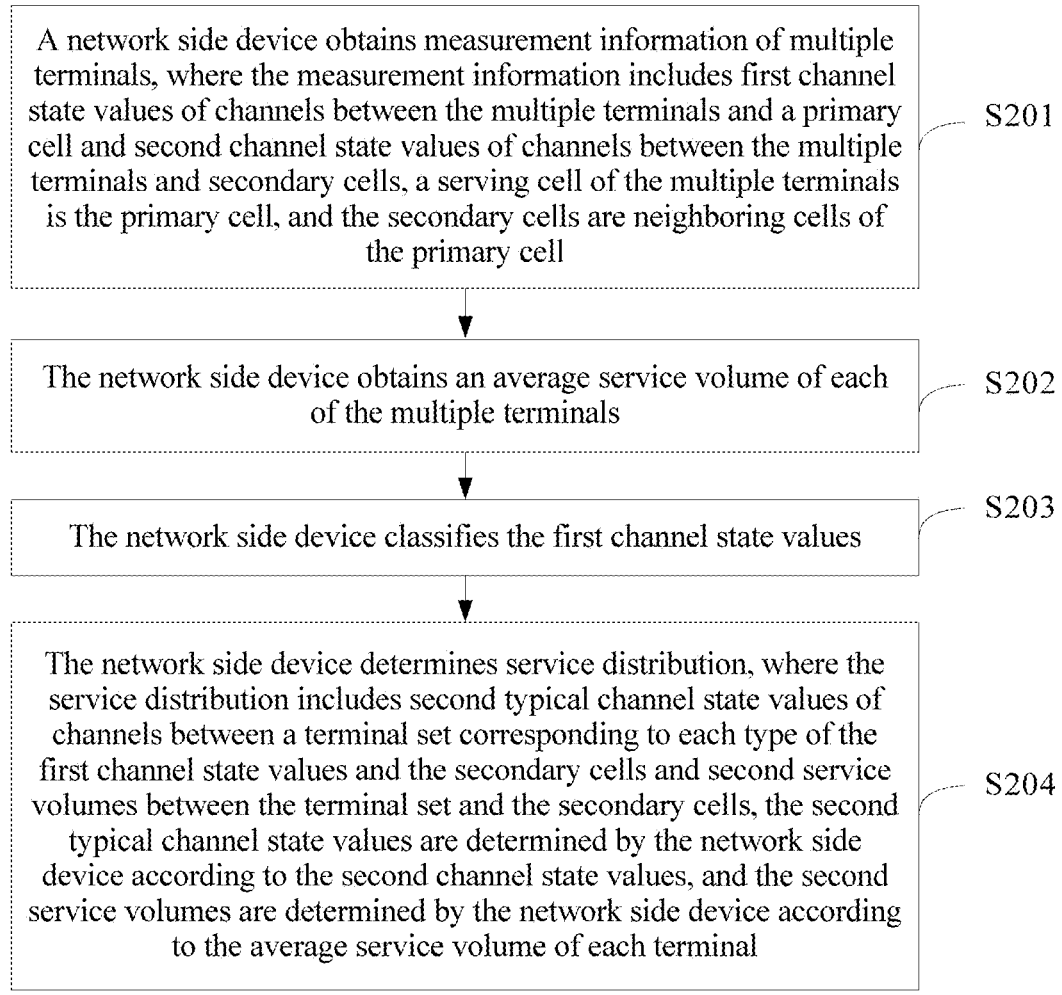
FIG. 3 is flowchart 2 of a service distribution obtaining method according to an embodiment of the present invention.

The following clearly describes the technical solutions in the embodiments of the present invention with reference to the accompanying drawings in the embodiments of the present invention. Apparently, the described embodiments are only some but not all of the embodiments of the present invention.

To better describe a service distribution obtaining method provided in the embodiments of the present invention, the following provides an exemplary description of the service distribution obtaining method provided in the embodiments of the present invention with reference to FIG. 1. As shown in FIG. 1, FIG. 1 is a block diagram of a communications system according to an embodiment of the present invention. A network side device serves a cell 1, a cell 2, and a cell 3. The cell 1 is a serving cell of a terminal 1, a terminal 2, and a terminal 3, the cell 2 is a serving cell of a terminal 4, and the cell 3 is a serving cell of a terminal 5. It is assumed that when the network side device needs to perform network optimization on the cell 1, the network side device needs to obtain service distribution in the cell 1, that is, the network side device needs to obtain distribution of a service of the terminal 1, a service of the terminal 2, and a service of the terminal 3 in the cell 1.

In the prior art, the network side device generally obtains geographical location information of the terminal 1, the service of the terminal 1, geographical location information of the terminal 2, the service of the terminal 2, geographical location information of the terminal 3, and the service of the terminal 3, so as to obtain the service distribution in the cell 1. However, in a service distribution obtaining method in the prior art, on one hand, a large amount of air interface data is generated when the network side device obtains the geographical location information of the terminals, thereby affecting network efficiency. On the other hand, if the terminal 1 disables a positioning function of the terminal 1 or does not provide a positioning function, the network side device can obtain only service distribution of the terminal 2 and the service of the terminal 3 in the cell 1. Consequently, the service distribution in the cell 1 that is obtained by the network side device is imprecise, and further, a network optimization effect of the cell 1 is affected when the service distribution in the cell 1 is used to optimize the cell 1.

In the service distribution obtaining method provided in the embodiments of the present invention, the network side device obtains service distribution of the terminal 1, the service of the terminal 2, and the service of the terminal 3 in a channel state, so as to obtain the service distribution in the cell 1. Obtaining the service distribution in the cell 1 by the network side device does not depend on obtaining of the geographical location information of the terminal 1, the terminal 2, and the terminal 3. Therefore, according to the service distribution obtaining method provided in the embodiments of the present invention, a network side device can obtain service distribution of all terminals in a cell 1 without affecting network efficiency, so that service distribution in the cell 1 that is obtained by the network side device is more precise, and further, an optimization effect is improved when the network side device uses the service distribution in the cell 1 to optimize the cell 1.

An embodiment of the present invention provides a service distribution obtaining method. As shown in FIG. 2, the method may include the following steps.

S101. A network side device obtains measurement information of multiple terminals in a serving cell, where the measurement information includes first channel state values of channels between the multiple terminals and a primary cell, and the primary cell refers to the serving cell or one of neighboring cells of the serving cell.

Optionally, the network side device may be a base station, and the base station may be specifically an evolved NodeB (eNB).

Optionally, because the network side device serves the multiple terminals, the network side device can directly obtain the measurement information of the multiple terminals. For example, the network side device may send a downlink reference signal to the multiple terminals, and the terminals measure the received downlink reference signal, and send the measurement information to the network side device. That is, the network side device receives the measurement information of the multiple terminals that is sent by the multiple terminals. Alternatively, the network side device may obtain the measurement information of the multiple terminals by measuring uplink reference signals sent by the multiple terminals. For another terminal served by another network side device, the network side device may obtain measurement information of the another terminal from the another network side device by using an interface between the network side device and the another network side device, for example, an interface X2 in a Long Term Evolution (LTE) network.

It should be noted that both the foregoing downlink reference signal and the foregoing uplink reference signal are used to measure a propagation characteristic of a channel between a terminal and a cell. Specifically, the foregoing downlink reference signal may be a downlink reference signal in the LTE network, for example, a cell-specific reference signal (CRS), or may be a signal that is in another network and that provides a same function as the downlink reference signal. The foregoing uplink reference signal may be an uplink reference signal in the LTE network, for example, a sounding reference signal (SRS), or may be a signal that is in another network and that provides a same function as the uplink reference signal.

Further, each of the first channel state values of the channels between the multiple terminals and the primary cell may be any measuring metric that can represent a propagation characteristic of the channel, for example, a channel gain or a path loss.

To better describe meanings of the first channel state values of the channels between the terminals and the primary cell, the following provides an exemplary description of a first channel state value only by using one terminal and the primary cell as an example.

It is assumed that a path loss is used to represent a first channel state value. A first channel state value of a channel between a terminal and a primary cell is a ratio of a power of sending an uplink reference signal by the terminal to a power of receiving, by the primary cell, the uplink reference signal sent by the terminal, or may be a ratio of a power of sending a downlink reference signal by the primary cell to a power of receiving, by the terminal, the downlink reference signal sent by the primary cell.

S102. The network side device obtains an average service volume of each of the multiple terminals.

Specifically, the network side device may collect statistics on service volumes of each of the multiple terminals at multiple measurement moments, for example, in two consecutive times of measurement (which may be understood as moments for consecutively obtaining measurement information twice by the network side device), and obtain the average service volume of each terminal according to the service volumes of each terminal. The average service volume may be understood as information about a resource occupied by data that is transmitted by the terminal in the serving cell of the terminal in a unit time.

For example, after the network side device performs S101 and S102, the network side device may obtain a first channel state value corresponding to each of the multiple terminals and the average service volume of each of the multiple terminals. As shown in Table 1, it is assumed that there are i terminals, which are respectively a terminal 1, a terminal 2, ..., and a terminal i, and the primary cell is a cell 1. If the path loss is used to represent the first channel state value, first channel state values of channels between the i terminals and the primary cell may be respectively indicated as $PL_{11}$ to $PL_{1i}$, and information about a resource (average service volumes of the i terminals) occupied by data that is respectively transmitted by the i terminals in a unit time may be indicated as $w_1$ to $w_i$.

TABLE 1

|  | Cell 1 | Information about a resource |
|---|---|---|
| Terminal 1 | $PL_{11}$ | $w_1$ |
| ... | ... | ... |
| Terminal i | $PL_{1i}$ | $w_i$ |

S103. The network side device classifies the first channel state values.

That the network side device classifies the first channel state values obtained in S101 may be specifically one of the following:

(1) Before the network side device obtains the measurement information of the multiple terminals, the network side device determines a channel state range according to a maximum value and a minimum value in empirical channel state values of the channels between the multiple terminals and the primary cell, and divides the channel state range into multiple channel state intervals. The network side device separately determines channel state intervals within which the first channel state values of the channels between the multiple terminals and the primary cell fall, to classify the first channel state values.

(2) The network side device determines a channel state range according to a maximum value and a minimum value in the obtained first channel state values of the channels between the multiple terminals and the primary cell, and divides the channel state range into multiple channel state intervals to classify the first channel state values.

S104. The network side device determines service distribution, where the service distribution includes a first typical channel state value of each type of the first channel state values and a first service volume between a terminal set corresponding to each type of the first channel state values and the primary cell, and the first service volume is determined according to the average service volume of each terminal.

Each type of the first channel state values may be understood as one channel state interval. Specifically, the first typical channel state value may be an average value of multiple first channel state values in each channel state interval, may be a median in multiple first channel state values in each channel state interval, or may be a weighted average value of multiple first channel state values in each channel state interval. A weighting coefficient for calculating the weighted average value may be an average service volume of each terminal in the terminal set corresponding to each type of first channel state values.

For example, it is assumed that, in Table 1, $PL_{11}$, $PL_{12}$, and $PL_{13}$ are a type of first channel state values, and $PL_{12}$ is a median in $PL_{11}$, $PL_{12}$, and $PL_{13}$. $PL_{12}$ is selected as a first typical channel state value of the type of first channel state values.

Further, the terminal set corresponding to each type of the first channel state values is a terminal set that includes terminals corresponding to first channel state values in each type of first channel state values. The network side device determines the first service volume between the terminal set and the primary cell according to the average service volume of each terminal. The first service volume is a sum of average service volumes of all the terminals in the terminal set.

In this embodiment of the present invention, service distribution in the cell in which the multiple terminals are located includes the first typical channel state value of each type of the first channel state values and the first service volume between the terminal set corresponding to each type of the first channel state values and the primary cell, where the first typical channel state value and the first service volume are obtained by the network side device and are of the cell in which the multiple terminals are located.

Specifically, it is assumed that the network side device needs to obtain service distribution in a cell a, there are i terminals in the cell a, the primary cell is the cell 1, and a path loss is used to represent first channel state values of channels between the i terminals and the cell 1. That is, the first channel state value may be indicated as a first path loss, and the primary cell may be the cell a or one of neighboring cells of the cell a. After the network side device obtains measurement information of all the i terminals in the cell a and average service volumes of the i terminals, a step of obtaining the service distribution in the cell a by the network side device according to the measurement information and the average service volumes of the i terminals includes the following steps.

S10. The network side device classifies the first channel state values.

The network side device classifies the first channel state values into k types, and determines a first typical channel state value of each type of the first channel state values in the k types of first channel state values. For example, when determining a first typical channel state value of the $j^{th}$ (j=1, ..., and k) type of first channel state values in the k types of first channel state values, the network side device may select a median in multiple first channel state values in the $j^{th}$ type of first channel state values as the first typical channel state value of the $j^{th}$ type of first channel state value. That is, in this example, the first typical channel state value of the $j^{th}$ type of first channel state values is a first typical path loss value, and the first typical path loss value may be indicated as $PL_j$. A terminal set corresponding to the $j^{th}$ type of first channel state values may be indicated as $U_{a,j,1}$.

Particularly, a method for classifying the first channel state values by the network side device may be one of the foregoing two methods for classifying the first channel state values by the network side device. A specific classification method has already been described in detail in the foregoing embodiment, and details are not described herein again.

S11. The network side device obtains a first service volume between a terminal set $U_{a,j,1}$ corresponding to the $j^{th}$ type of first channel state values and the cell 1.

The network side device determines the first service volume between $U_{a,j,1}$ and the cell 1 according to an average service volume of each terminal in $U_{a,j,1}$. The average service volume of each terminal in $U_{a,j,1}$ may be indicated as $w_i$, that is, information about a resource occupied by data that is transmitted by each terminal in $U_{a,j,1}$ in the cell a in a unit time. The first service volume may be indicated as $W_{a,j,1}$, that is, a sum of the average service volumes of all the terminals in a $U_{a,j,1}$, and a formula for calculating $W_{a,j,1}$ is shown as follows:

$$W_{a,j,1} = \sum_{i \in U_{a,j,1}} w_i$$

Further, the network side device may obtain, by performing step S1 and step S2, $PL_j$ and $W_{a,j,1}$ that are corresponding to each type of the first channel state values and are in the cell a, as shown in Table 2. The service distribution in the cell a includes $PL_j$ and $W_{a,j,1}$.

TABLE 2

| Channel state classification of a cell a | First typical channel state value of a channel and a first service volume between a terminal set and a primary cell |
|---|---|
| The first type of first channel state values | $(PL_1, W_{a,1,1})$ |
| ... | ... |
| The $j^{th}$ type of first channel state values | $(PL_j, W_{a,j,1})$ |
| ... | ... |
| The $k^{th}$ type of first channel state values | $(PL_k, W_{a,k,1})$ |

In this embodiment of the present invention, service distribution obtained by a network side device is distribution of a service in a channel state. In the service distribution obtaining method provided in this embodiment of the present invention, channels between multiple terminals in a serving cell and a primary cell are measured, and the network side device classifies first channel state values that are of channels between the multiple terminals and the primary cell and that are included in measurement information of the multiple terminals, and obtains both a first typical channel state value and a first service volume that are corresponding to each type of first channel state values, so that the network side device obtains distribution of services of the multiple terminals in a channel state, that is, the network side device obtains service distribution in the serving cell of the multiple terminals. The service distribution provided in this embodiment of the present invention is obtained by measuring channels, classifying and calculating channel measurement results, collecting statistics on services transmitted on the channels, and the like. Therefore, compared with the prior art in which service distribution of the serving cell of the multiple terminals is obtained according to compared with the prior art in which service distribution in a serving cell of multiple terminals is obtained according to geographical location information of the multiple terminals and services transmitted by the multiple terminals, in the service distribution obtaining method provided in this embodiment of the present invention, the network side device can obtain service distribution of all terminals in a network without affecting network efficiency.

An embodiment of the present invention provides another service distribution obtaining method. As shown in FIG. 3, the method may include the following steps.

S201. A network side device obtains measurement information of multiple terminals, where the measurement information includes first channel state values of channels between the multiple terminals and a primary cell and second channel state values of channels between the multiple terminals and secondary cells, a serving cell of the multiple terminals is the primary cell, and the secondary cells are neighboring cells of the primary cell.

Optionally, because the network side device serves the multiple terminals, the network side device can directly obtain the measurement information of the multiple terminals. For example, the network side device may send a downlink reference signal to the multiple terminals, and the terminals measure received downlink reference signal, and send the measurement information to the network side device. That is, the network side device receives the measurement information of the multiple terminals that is sent by the multiple terminals. Alternatively, the network side device may obtain the measurement information of the multiple terminals by measuring uplink reference signals sent by the multiple terminals. For another terminal served by another network side device, the network side device may obtain measurement information of the another terminal from the another network side device by using an interface between the network side device and the another network side device, for example, an interface X2 in an LTE network.

Further, each of the second channel state values of the channels between the multiple terminals and the secondary cells may be any measuring metric that can represent a propagation characteristic of the channel, for example, a channel gain or a path loss.

To better describe meanings of the second channel state values of the channels between the terminals and the secondary cells, the following provides an exemplary description of a second channel state value only by using one terminal and one secondary cell as an example.

It is assumed that a path loss is used to represent a second channel state value. A second channel state value of a channel between a terminal and a secondary cell is a ratio of a power of receiving, by the secondary cell, an uplink reference signal sent by the terminal to a power of sending the uplink reference signal by the terminal, or may be a ratio of a power of receiving, by the terminal, a downlink reference signal sent by the secondary cell to a power of sending the downlink reference signal by the secondary cell.

Further, for a manner of representing the first channel state values of the channels between the multiple terminals and the primary cell, refer to a related description in the embodiment shown in FIG. 2, and details are not described herein again.

S202. The network side device obtains an average service volume of each of the multiple terminals.

Specifically, for a method for obtaining the average service volume of each of the multiple terminals by the network side device, refer to a related description in the embodiment shown in FIG. 2, and details are not described herein again.

For example, after the network side device performs step S201 and step S202, the network side device may obtain a first channel state value and a second channel state value that are corresponding to each of the multiple terminals and the average service volume of each of the multiple terminals. As shown in Table 3, it is assumed that there are i terminals, which are respectively a terminal 1, a terminal 2, . . . , and a terminal i, the primary cell (that is, the serving cell of the multiple terminals) is a cell 1, and the secondary cells (that is, the neighboring cells of the multiple terminals) are respectively a cell 2, a cell 3, . . . , and a cell N. If a path loss is used to represent the first channel state value and the second channel state value, first channel state values of channels between the i terminals and the primary cell may be respectively indicated as $PL_{11}$ to $PL_{1i}$, and second channel states of channels between the i terminals and the secondary cells may be respectively indicated as $PL_{21}$ to $PL_{N1}$. Likewise, second channel states of channels between the terminal i and the secondary cells may be respectively indicated as $PL_{2i}$ to $PL_{Ni}$ and information about a resource (that is, average service volumes of the i terminals) occupied by data that is transmitted by the i terminals in a unit time may be respectively indicated as $w_1$ to $W_i$.

TABLE 3

|  | Cell 1 | Cell 2 | ... | Cell N | Information about a resource |
|---|---|---|---|---|---|
| Terminal 1 | $PL_{11}$ | $PL_{21}$ | ... | $PL_{N1}$ | $w_1$ |
| ... | ... | ... | ... | ... | ... |
| Terminal i | $PL_{1i}$ | $PL_{2i}$ | ... | $PL_{Ni}$ | $w_i$ |

S203. The network side device classifies the first channel state values.

Specifically, for a method for classifying, by the network side device, the first channel state values obtained in step S201, refer to a related description in the embodiment shown in FIG. 2, and details are not described herein again.

S204. The network side device determines service distribution, where the service distribution includes second typical channel state values of channels between a terminal set corresponding to each type of the first channel state values and the secondary cells and second service volumes between the terminal set and the secondary cells, the second typical channel state values are determined by the network side device according to the second channel state values, and the second service volumes are determined by the network side device according to the average service volume of each terminal.

It should be noted that because meanings of the second typical channel state values of the channels between the terminal set corresponding to each type of the first channel state values and the secondary cells are the same, the following describes a meaning of a second typical channel state value by using a second typical channel state value of a channel between the terminal set corresponding to each type of the first channel state values and one secondary cell as an example.

Specifically, the second typical channel state value of the channel between the terminal set corresponding to each type of the first channel state values and the secondary cell may be an average value of multiple second channel state values of the channel between the terminal set and the secondary cell, may be a median in multiple second channel state values of the channel between the terminal set and the secondary cell, or may be a weighted average value of multiple second channel state values of the channel between the terminal set and the secondary cell. A weighting coefficient for calculating the weighted average value may be an average service volume of each terminal in the terminal set.

Preferably, in this embodiment of the present invention, to provide better reference information for application of network technologies, the second typical channel state value may be the weighted average value of the multiple second channel state values of the channel between the terminal set and the secondary cell.

For example, it is assumed that in Table 3, the terminal 1 and the terminal 2 are a terminal set corresponding to a type of first typical channel state value, second channel state values of channels between the terminal 1 and the terminal 2 and the cell 2 are respectively $PL_{21}$ and $PL_{22}$, and average service volumes of the terminal 1 and the terminal 2 are respectively $w_1$ and $w_2$. A second typical channel state value of a channel between this type of terminals and the cell 2 is:

$$PL_{2,typ} = (w_1 + w_2) \cdot \left( \frac{w_1}{PL_{21}} + \frac{w_2}{PL_{22}} \right)^{-1},$$

where $PL_{2,typ}$ indicates the second typical channel state value of the channel between the terminal set corresponding to the type of first channel state values and the cell 2.

Further, the second service volumes between the terminal set corresponding to each type of the first channel state values and the secondary cells are a sum of average service volumes of all terminals in a terminal set that is in the terminal set corresponding to each type of the first channel state values and that is relative to the secondary cells.

The terminal set that is in the terminal set corresponding to each type of the first channel state values and that is relative to the secondary cells may be understood as a set of terminals in the terminal set corresponding to each type of first channel state values, where second channel state values of channels between the terminals and the secondary cells are measurable and significant values.

For example, if a path loss is used to represent the second channel state value, when the path loss is not infinitely great, that is, when a power of receiving, by the secondary cells, an uplink reference signal sent by the terminal in the terminal set is not equal to 0, the second channel state value is a measurable and significant value. If a channel gain is used to represent the second channel state value, when the channel gain is not 0, that is, when a power of receiving, by the secondary cells, an uplink reference signal sent by the terminal in the terminal set is not equal to 0, the second channel state value is a measurable and significant value.

In this embodiment of the present invention, service distribution in the cell in which the multiple terminals are located includes the second typical channel state values of the channels between the terminal set corresponding to each type of the first channel state values and the secondary cells and the second service volumes between the terminal set and the secondary cells, where the second typical channel state values and the second service volumes are obtained by the network side device and are of the cell in which the multiple terminals are located.

Specifically, it is assumed that the network side device needs to obtain service distribution in a cell a, there are i terminals in the cell a, the primary cell is the cell 1, the secondary cells are respectively the cell 2, the cell 3, . . . , and the cell N, and a path loss is used to represent first channel state values of channels between the i terminals and the cell a and second channel state values of channels between the i terminals and the secondary cells, that is, the first channel state value may be indicated as a first path loss, and the second channel state value may be indicated as a second path loss. The cell a is a primary cell, and the secondary cells are neighboring cells of the cell a. After the network side device separately obtains measurement information of the i terminals in the cell a and average service volumes of the i terminals, a step of obtaining the service distribution in the cell a by the network side device according to the measurement information and the average service volumes of the i terminals includes the following steps.

S20. The network side device classifies the first channel state values.

The network side device classifies the first channel state values into k types. A terminal set corresponding to the $j^{th}$ (j=1, . . . , and k) type of first channel state values in the k types of first channel state values may be indicated as $U_{a,j,1}$.

Particularly, a method for classifying the first channel state values by the network side device may be one of the foregoing two methods for classifying the multiple terminals by the network side device; a specific classification method has already been described in detail in the foregoing embodiment, and details are not described herein again.

S21. The network side device obtains second typical channel state values of channels and second service volumes between a terminal set $U_{a,j,1}$ corresponding to the $j^{th}$ type of first channel state values and the secondary cells.

The network side device determines, according to second channel state values of channels between all terminals in $U_{a,j,1}$ and the secondary cells, a terminal set that is in $U_{a,j,1}$ and that is relative to the secondary cells, where the terminal set may be indicated as $U_{a,j,sec}$; and obtains second service volumes between $U_{a,j,sec}$ and the secondary cells according to an average service volume of each terminal in $U_{a,j,sec}$. The average service volume of each terminal in $U_{a,j,sec}$ may be indicated as $w_i'$, that is, information about a resource occupied by data that is transmitted by each terminal in $U_{a,j,sec}$ in the cell a in a unit time. The second service volume may be indicated as $W_{a,j,sec}$ that is, a sum of the average service volumes of all the terminals in $U_{a,j,sec}$.

It should be noted that if the second channel state values of the channels between all the terminals in $U_{a,j,1}$ and the secondary cells are all measurable and significant values, $U_{a,j,sec}$ is the same as $U_{a,j,1}$; or if second channel states of channels between some terminals in $U_{a,j,1}$ and a secondary cell are not measurable and significant values, $U_{a,j,sec}$ corresponding to the secondary cell is a subset of $U_{a,j,1}$. For example, it is assumed that $U_{a,j,1}$={the terminal 1, the terminal 2, a terminal 3, a terminal 4, a terminal 5}. If second channel state values of channels between the terminal 1, the terminal 2, the terminal 3, the terminal 4, and the terminal 5 and the secondary cells are all measurable and significant values, $U_{a,j,sec}$ is {the terminal 1, the terminal 2, the terminal 3, the terminal 4, the terminal 5}; or if second channel state values of channels between the terminal 1 and the terminal 2 and a secondary cell are not measurable and significant values, $U_{a,j,sec}$ corresponding to the secondary cell is {the terminal 3, the terminal 4, the terminal 5}.

The network side device determines second typical path loss values of channels between $U_{a,j,sec}$ and the secondary cells, that is, second typical channel state values of the channels between $U_{a,j,sec}$ and the secondary cells, according to $w_i'$ of each terminal in $U_{a,j,sec}$ and second path losses between each terminal in $U_{a,j,sec}$ and the secondary cells. The second typical path loss values of the channels between $U_{a,j,sec}$ and the secondary cells may be indicated as $PL_{a,j,sec}$, the second path loss may be indicated as $PL_{i,sec}$, and a formula for calculating $W_{a,j,sec}$ and $PL_{a,j,sec}$ is shown as follows:

$$W_{a,j,sec} = \sum_{i \in U_{a,j,sec}} w_i'$$

$$PL_{a,j,sec} = \left( \frac{1}{W_{a,j,sec}} \sum_{i \in U_{a,j,sec}} (w_i' \cdot PL_{j,sec}^{-1}) \right)^{-1}.$$

Further, as shown in Table 4, the network side device may obtain, by performing step S20 and step S21, $PL_{a,j,sec}$ and $W_{a,j,sec}$ that are corresponding to each type of the first channel state values in the cell a. The service distribution in the cell a includes $PL_{a,j,sec}$ and $W_{a,j,sec}$.

TABLE 4

| Channel state classification of a cell a | Second typical channel state values of channels and second service volumes between a terminal set and secondary cells |
|---|---|
| The first type of first channel state values | $(PL_{a,1,sec}, W_{a,1,sec})$ |
| ... | ... |
| The $j^{th}$ type of first channel state values | $(PL_{a,j,sec}, W_{a,j,sec})$ |
| ... | ... |
| The $k^{th}$ type of first channel state values | $(PL_{a,k,sec}, W_{a,k,sec})$ |

In this embodiment of the present invention, service distribution obtained by a network side device is distribution of a service in a channel state. In the service distribution obtaining method provided in this embodiment of the present invention, channels between multiple terminals in one cell and a primary cell and channels between multiple terminals in the cell and secondary cells are measured, and a network side device classifies first channel state values that are of channels between the multiple terminals and the primary cell and that are included in measurement information of the multiple terminals, and separately obtains a second typical channel state value and a second service volume that are corresponding to each type of first channel state values, so that the network side device obtains distribution of services of the multiple terminals in a channel state, that is, the network side device obtains service distribution in the serving cell of the multiple terminals. The service distribution provided in this embodiment of the present invention is obtained by measuring channels, classifying and calculating channel measurement results, collecting statistics on services transmitted on the channels, and the like. Therefore, compared with the prior art in which service distribution in a serving cell of multiple terminals is obtained according to geographical location information of the multiple terminals and services transmitted by the multiple terminals, in the service distribution obtaining method provided in this embodiment of the present invention, the network side device can obtain service distribution of all terminals in a network without affecting network efficiency.

Figure 4:
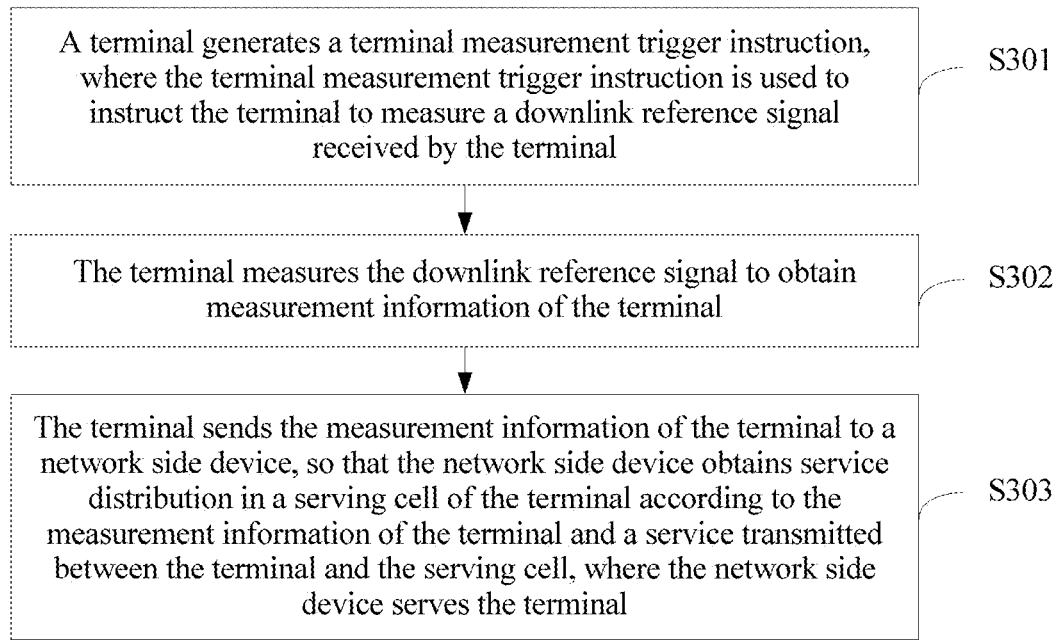
FIG. 4 is flowchart 3 of a service distribution obtaining method according to an embodiment of the present invention.

An embodiment of the present invention provides a service distribution obtaining method. As shown in FIG. 4, the method may include the following steps.

S301. A terminal generates a terminal measurement trigger instruction, where the terminal measurement trigger instruction is used to instruct the terminal to measure a received downlink reference signal.

S302. The terminal measures the downlink reference signal to obtain measurement information of the terminal.

S303. The terminal sends the measurement information of the terminal to a network side device, so that the network side device obtains service distribution in a serving cell of the terminal according to the measurement information of the terminal and a service transmitted between the terminal and the serving cell, where the network side device serves the terminal.

For a specific implementation manner of obtaining the service distribution in the serving cell of the terminal by the network side device according to the measurement information and the service transmitted between the terminal and the serving cell of the terminal, refer to the embodiment shown in FIG. 2 or a related description in the embodiment shown in FIG. 3, and details are not described herein again.

In this embodiment of the present invention, a terminal sends measurement information to the network side device, so that the network side device obtains distribution of a service of the terminal in a channel state according to the measurement information of the terminal and the service that is transmitted between the terminal and a serving cell of the terminal, that is, the network side device obtains service distribution in the cell in which the terminal is located. Compared with service distribution in the prior art, the service distribution provided in this embodiment of the present invention is obtained by measuring channels, classifying and calculating channel measurement results, collecting statistics on services transmitted on the channels, and the like. Therefore, in the service distribution obtaining method provided in this embodiment of the present invention, the network side device can obtain service distribution of all terminals in a network without affecting network efficiency.

Figure 5:
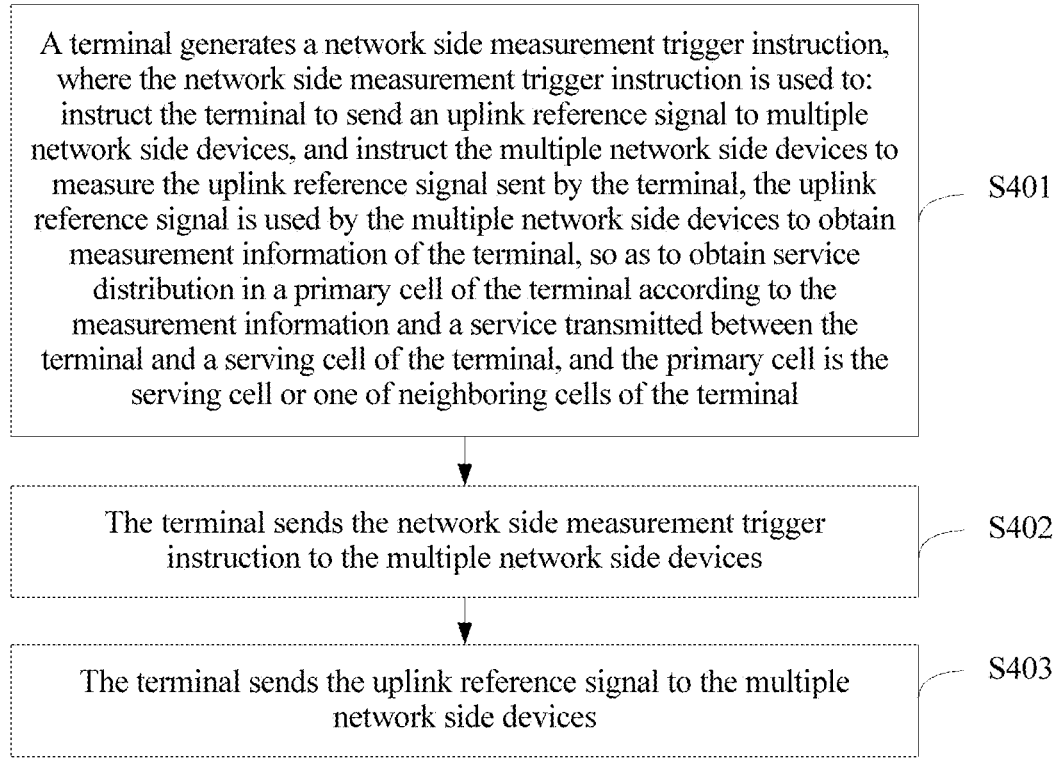
FIG. 5 is flowchart 4 of a service distribution obtaining method according to an embodiment of the present invention.

An embodiment of the present invention provides a service distribution obtaining method. As shown in FIG. 5, the method may include the following steps.

S401. A terminal generates a network side measurement trigger instruction, where the network side measurement trigger instruction is used to: instruct the terminal to send an uplink reference signal to multiple network side devices, and instruct the multiple network side devices to measure the uplink reference signal sent by the terminal, and the uplink reference signal is used by the multiple network side devices to obtain measurement information of the terminal, so as to obtain service distribution in a serving cell of the terminal according to the measurement information and a service transmitted between the terminal and the serving cell.

Network side devices, other than a network side device that serves the terminal, in the multiple network side devices each measure the uplink reference signal that is sent by the terminal and received by the network side devices, and send, by using an interface X2, the measurement information to the network side device that serves the terminal. Then, the network side device that serves the terminal obtains the service distribution in the serving cell of the terminal according to the measurement information and the service transmitted between the terminal and the serving cell of the terminal.

Further, for a specific implementation manner of obtaining, by the network side device that serves the terminal, the service distribution in the serving cell of the terminal according to the measurement information and the service transmitted between the terminal and the serving cell of the terminal, refer to the embodiment shown in FIG. 2 or a related description in the embodiment shown in FIG. 3, and details are not described herein again.

S402. The terminal sends the network side measurement trigger instruction to the multiple network side devices.

S403. The terminal sends the uplink reference signal to the multiple network side devices.

In this embodiment of the present invention, the terminal can generate a network side measurement trigger instruction to instruct the terminal to send an uplink reference signal to multiple network side devices, and instruct the multiple network side devices to measure the uplink reference signal sent by the terminal, so that the network side device obtains measurement information of the terminal, and the network side device obtains distribution of a service of the terminal in a channel state according to the measurement information of the terminal and the service that is transmitted between the terminal and a serving cell of the terminal, that is, the network side device obtains service distribution in the cell in which the terminal is located. The service distribution provided in this embodiment of the present invention is obtained by measuring channels, classifying and calculating channel measurement results, collecting statistics on services transmitted on the channels, and the like. Therefore, compared with the prior art in which service distribution in a serving cell of multiple terminals is obtained according to geographical location information of the multiple terminals and services transmitted by the multiple terminals, in the service distribution obtaining method provided in this embodiment of the present invention, the network side device can obtain service distribution of all terminals in a network without affecting network efficiency.

Figure 6:
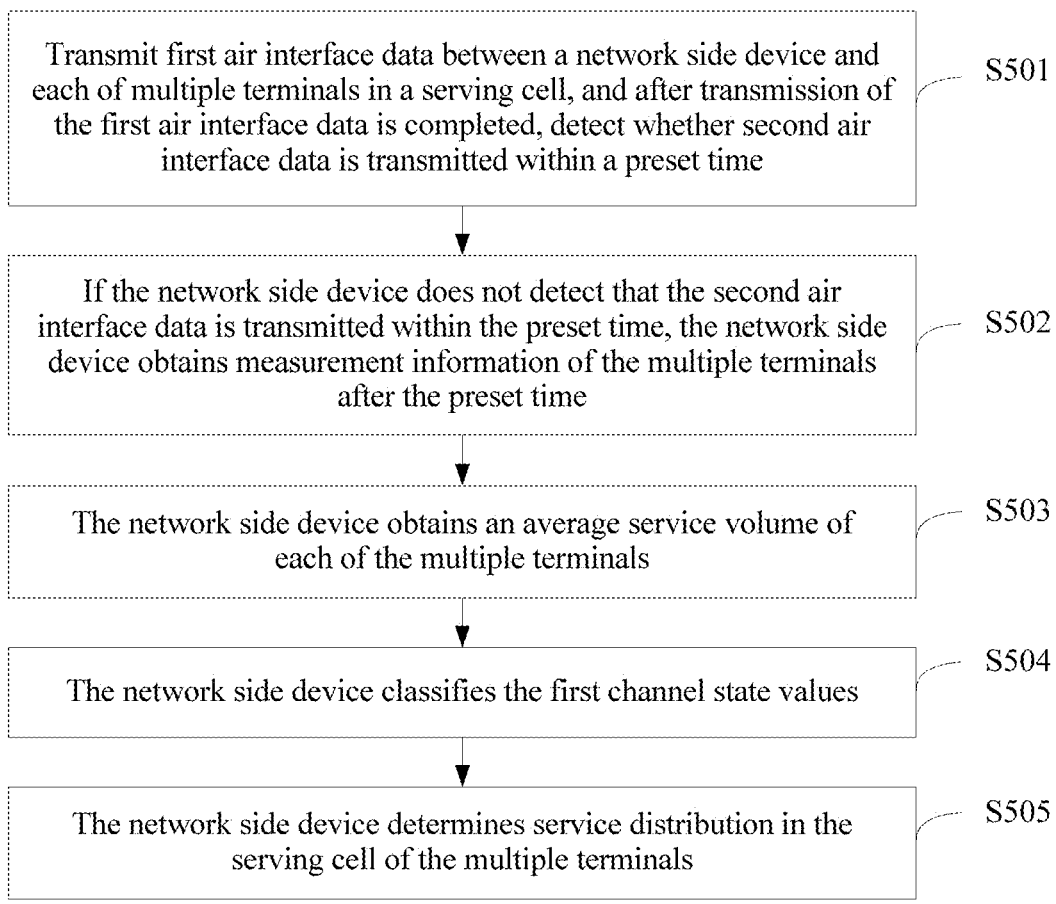
FIG. 6 is flowchart 5 of a service distribution obtaining method according to an embodiment of the present invention.

An embodiment of the present invention provides a service distribution obtaining method. As shown in FIG. 6, the method includes the following steps.

S501. Transmit first air interface data between a network side device and each of multiple terminals in a serving cell, and after transmission of the first air interface data is completed, detect whether second air interface data is transmitted within a preset time.

It should be noted that a transmission resource between the network side device and the terminal is an air interface resource, and data transmitted by using the air interface resource is air interface data. In this embodiment of the present invention, the first air interface data is data transmitted between the network side device and each of the multiple terminals.

S502. If the network side device does not detect that the second air interface data is transmitted within the preset time, the network side device obtains measurement information of the multiple terminals after the preset time, where the measurement information includes first channel state values of channels between the multiple terminals and a primary cell, and the primary cell refers to the serving cell or one of neighboring cells of the serving cell.

Specifically, a manner of obtaining measurement information of the multiple terminals by the network side device may be one of the following.

(1) If each of the multiple terminals measures a downlink reference signal received by the terminal, to obtain measurement information of the terminal, when the multiple terminals are in an idle mode (Idle), each of the multiple terminals periodically generates a terminal measurement trigger instruction, measures the downlink reference signal of the primary cell that is received by the terminal, and reports the measurement information to the network side device. The terminal may measure a reference signal received power (RSRP) of the primary cell that is received by the terminal. The RSRP of the primary cell includes a cell identity of the primary cell. When the multiple terminals are in an active mode (Active), after the transmission of the first air interface data between each of the multiple terminals and the network side device is completed, if the terminal does not detect that the second air interface data is transmitted within the preset time, after the preset time, the terminal generates the terminal measurement trigger instruction to instruct the terminal to measure the RSRP of the primary cell that is received by the terminal, and reports the measurement information to the network side device.

Figure 7:
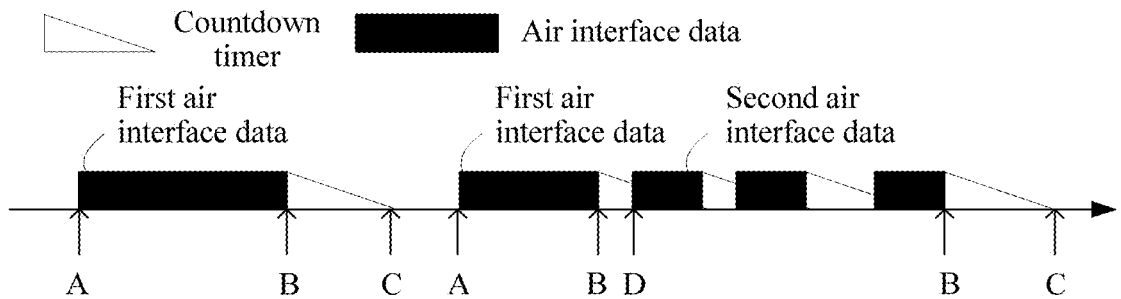
FIG. 7 is a schematic diagram of generation of a measurement trigger instruction according to an embodiment of the present invention.

Optionally, the preset time may be implemented by using a timer. For example, a countdown timer is disposed in each of the multiple terminals, and an initial value of the countdown timer is set. As shown in FIG. 7, when the first air interface data starts to be transmitted between each of the multiple terminals and the network side device, at a point A shown in FIG. 7, the multiple terminals separately detect whether the countdown timer is activated. If the countdown timer is not activated, the multiple terminals each activate the countdown timer; or if the countdown timer has already been activated, when the transmission of the first air interface data is completed, the countdown timer is started at a point B shown in FIG. 7, and when the countdown timer counts down to zero at a point C shown in FIG. 7, the multiple terminals each deactivate the countdown timer, and generate the terminal measurement trigger instruction. If the countdown timer is started, when the countdown timer has not counted down to zero, the multiple terminals each detect the transmission of the second air interface data at a point D shown in FIG. 7, the multiple terminals each stop timing and reset a timing length of the countdown timer to the initial value.

(2) A difference from (1) lies in that when the multiple terminals are in an active mode, the network side device generates a first measurement trigger instruction, and sends the first measurement trigger instruction to the multiple terminals, and the multiple terminals measure, according to the first measurement trigger instruction, an RSRP of the primary cell that is separately received by the multiple terminals, and report the measurement information to the network side device. Specifically, after the transmission of the first air interface data between each of the multiple terminals and the network side device is completed, if the network side device does not detect that the second air interface data is transmitted within the preset time, after the preset time, the network side device generates the first measurement trigger instruction, and sends the first measurement trigger instruction to the multiple terminals. The multiple terminals measure, according to the first terminal measurement trigger instruction, the RSRP of the primary cell that is separately received by the multiple terminals, and report the measurement information to the network side device.

Optionally, the preset time may be implemented by using a timer. For example, a countdown timer is disposed in the network side device, and an initial value of the countdown timer is set. As shown in FIG. 7, when the first air interface data starts to be transmitted between the terminal and the network side device, for example, at a point A shown in FIG. 7, the network side device detects whether the countdown timer is activated. If the countdown timer is not activated, the network side device activates the countdown timer; or if the countdown timer has already been activated, when the transmission of the first air interface data is completed, the countdown timer is started at a point B shown in FIG. 7, and when the countdown timer counts down to zero at a point C shown in FIG. 7, the network side device deactivates the countdown timer, and generates the first terminal measurement trigger instruction. If the countdown timer is started, when the countdown timer has not counted down to zero, the network side device detects the transmission of the second air interface data at a point D shown in FIG. 7, the network side device stops timing and resets a timing length of the countdown timer to the initial value.

(3) If the network side device measures uplink reference signals of the multiple terminals to obtain the measurement information of the multiple terminals, when the multiple terminals are in an idle mode, each of the multiple terminals periodically sends the uplink reference signal to multiple network side devices. The uplink reference signals may be SRSs of the multiple terminals, and the SRSs of the multiple terminals respectively include user equipment identifiers (UEID) of the multiple terminals. When the multiple terminals are in an active mode, the network side device (that is, a network side device that serves the multiple terminals) generates a second measurement trigger instruction, and sends the second measurement trigger instruction to the multiple terminals, and the multiple terminals send the uplink reference signal to the multiple network side devices according to the second measurement trigger instruction. If the primary cell is a serving cell of the multiple terminals, the network side device obtains the measurement information of the multiple terminals by measuring uplink reference signals received by the network side device. If the primary cell is one of the neighboring cells of the multiple terminals, a network side device that serves the primary cell obtains the measurement information of the multiple terminals by measuring uplink reference signals received by the network side device that serves the primary cell, and sends the measurement information to the network side device by using an interface between network side devices, so that the network side device obtains the measurement information of the multiple terminals. Specifically, after the transmission of the first air interface data is completed, if the network side device does not detect that the second air interface data is transmitted within the preset time, after the preset time, the network side device generates the second measurement trigger instruction, and sends the second measurement trigger instruction to the multiple terminals, to instruct the multiple terminals to separately send the SRSs to the network side device. If the primary cell is a serving cell of the multiple terminals, the network side device measures the SRSs separately received by the network side device, to obtain the measurement information of the multiple terminals. If the primary cell is one of the neighboring cells of the multiple terminals, the network side device receives the measurement information of the multiple terminals that is sent by the network side device that serves the primary cell.

Optionally, a specific manner of implementing the preset timer is similar to a specific manner of implementing the preset timer in (2), and a difference lies in that in this manner, when the countdown timer counts down to zero at a point C shown in FIG. 7, the network side device deactivates the countdown timer and generates the second measurement trigger instruction. For another process, refer to a related description in (2), and details are not described herein again.

(4) A difference from (3) lies in that when the multiple terminals are in an active mode, the multiple terminals separately generate a third measurement trigger instruction (that is, a network side measurement trigger instruction), to separately instruct the multiple terminals to respectively send SRSs to multiple network side devices and instruct the multiple network side devices to measure the SRSs respectively received by the multiple network side devices. Specifically, after the transmission of the first air interface data is completed, if the multiple terminals do not detect that the second air interface data is transmitted within the preset time, the multiple terminals separately generate the third measurement trigger instruction after the preset time, to instruct the multiple terminals to respectively send the SRSs to the multiple network side devices and instruct the multiple network side devices to measure the SRSs separately received by the multiple network side devices.

Optionally, the third measurement trigger instruction may be a synchronization request message, and the synchronization request message includes a indicator for requesting to send an uplink reference signal, where the indicator is used to request the network side device to receive the SRS sent by the terminal. Alternatively, the third measurement trigger instruction may be a synchronization instruction message, and the synchronization instruction message includes an uplink reference signal sending instruction and a sending timestamp (English: timestamp), to instruct the network side device to measure the SRS when the network side device receives the SRS sent by the terminal.

For example, when the terminal needs to send the SRS to the network side device with permission of the network side device, the third measurement trigger instruction is a synchronization request message. Therefore, before sending the SRS, the terminal needs to send the synchronization request message to the multiple network side devices, and the terminal does not separately complete sending of the SRS under the control of the multiple network side devices until the multiple network side devices allow receiving of the SRS sent by the terminal. Alternatively, when the terminal may directly send the SRS to the network side device without permission of the network side device, the third measurement trigger instruction is a synchronization instruction message. Therefore, before sending the SRS, the terminal needs to send the synchronization instruction message to the multiple network side devices, to instruct the multiple network side devices to measure the SRS sent by the terminal. The multiple network side devices and the terminal may be synchronized in the foregoing two manners.

Further, the third measurement trigger instruction may be implemented by setting a new message; or the third measurement trigger instruction may be carried in an existing message and sent to the multiple network side devices. This is not limited in the present invention.

The third measurement trigger instruction may be understood as a network side measurement trigger instruction in the embodiment shown in FIG. 5.

Optionally, a specific manner of implementing the preset timer is similar to a specific manner of implementing the preset timer in (1), and a difference lies in that in this manner, when the countdown timer counts down to zero at a point C shown in FIG. 7, the multiple terminals deactivate the countdown timer and generate the third measurement trigger instruction. For another process, refer to a related description in (1), and details are not described herein again.

Further, in this embodiment of the present invention, that the network side device or the terminal detects whether the countdown timer is activated means that the network side device or the terminal detects whether a status bit of the countdown timer is an active state. For example, that the status bit of the countdown timer is 1 indicates that the countdown timer is in an active state. If the status bit of the countdown timer is set to 1, it indicates activating the countdown timer. If the status bit of the countdown timer is set to 0, it indicates deactivating the countdown timer.

S503. The network side device obtains an average service volume of each of the multiple terminals.

S504. The network side device classifies the first channel state values.

S505. The network side device determines service distribution in the serving cell of the multiple terminals.

In this embodiment of the present invention, that the network side device determines service distribution in the serving cell of the multiple terminals is specifically: the network side device determines a first typical channel state value of each type of first channel state values, and determines a first service volume between a terminal set corresponding to each type of the first channel state values and the primary cell according to the average service volume of each terminal. The service distribution in the serving cell of the multiple terminals includes the first typical channel state value and the first service volume. So far, the network side device has obtained the service distribution in the serving cell of the multiple terminals. Specifically, for a specific implementation process of obtaining the service distribution in the serving cell of the multiple terminals by the network side device, refer to a description and an example in a related process in the embodiment shown in FIG. 2, and details are not described herein again.

Optionally, in step S502, the measurement information of the multiple terminals that is obtained by the network side device may further include second channel state values of channels between the multiple terminals and secondary cells, and the secondary cells are cells, other than the primary cell, in the serving cell and the neighboring cells.

Further, in step S505, the service distribution that is of the serving cell of the multiple terminals and that is determined by the network side device further includes second typical channel state values of channels between the terminal set and the secondary cells and second service volumes between the terminal set and the secondary cells. The second typical channel state values are determined by the network side device according to the second channel state values, and the second service volumes are determined by the network side device according to the average service volume of each terminal.

Further, in this embodiment of the present invention, the manner of obtaining measurement information of the multiple terminals by the network side device is similar to a manner, shown in FIG. 6, of obtaining the measurement information of the multiple terminals by the network side device. In this embodiment of the present invention, manner (1) and manner (2) of obtaining the measurement information of the multiple terminals by the network side device differ from manner (1) and manner (2), shown in FIG. 6, of obtaining the measurement information of the multiple terminals by the network side device in that: each of the multiple terminals measures RSRPs of the secondary cells of the multiple terminals and an RSRP of the serving cell of the multiple terminals that are received by each of the multiple terminals, and reports measurement information obtained by means of measurement to the network side device. In this embodiment of the present invention, manner (3) and manner (4) of obtaining the measurement information of the multiple terminals by the network side device differ from the (3) and the (4), shown in FIG. 6, of obtaining the measurement information of the multiple terminals by the network side device in that: the network side device obtains first measurement information by measuring the uplink reference signals sent by the multiple terminals, receives second measurement information sent by a network side device that serves the neighboring cells of the multiple terminals, and obtains the measurement information of the multiple terminals according to the first measurement information and the second measurement information.

For a specific manner of determining, by the network side device, the second typical channel state values of the channels between the terminal set and the secondary cells and the second service volume between the terminal set and the secondary cells, refer to a specific description in S204 in the embodiment shown in FIG. 3, and details are not described herein again.

The service distribution in the serving cell of the multiple terminals includes the first typical channel state value, the first service volume, the second typical channel state values, and the second service volumes. So far, the network side device has obtained the service distribution in the serving cell of the multiple terminals.

Specifically, it is assumed that the network side device needs to obtain service distribution in a cell a (the cell a is the cell a in the example in the embodiment shown in FIG. 2), and the secondary cells are respectively a cell 2, a cell 3, . . . , and a cell N. The second channel state value may be indicated as a second path loss. After the service distribution in the cell a is obtained by the network side device in S11, the method may further include:

S12. The network side device obtains second typical channel state values of channels and second service volumes between $U_{a,j,1}$ corresponding to the $j^{th}$ type of channel state values and the secondary cells.

The network side device determines, according to second channel state values of channels between all terminals in $U_{a,j,1}$ and the secondary cells, a terminal set that is $U_{a,j,1}$ and that is relative to the secondary cells, where the terminal set may be indicated as $U_{a,j,sec}$; and obtains second service volumes between $U_{a,j,sec}$ and the secondary cells according to an average service volume of each terminal in $U_{a,j,sec}$. The average service volume of each terminal in $U_{a,j,sec}$ may be indicated as $w_i'$, that is, information about a resource occupied by data that is transmitted by each terminal in $U_{a,j,sec}$ in the cell a in a unit time. The second service volume may be indicated as $W_{a,j,sec}$ that is, a sum of the average service volumes of all the terminals in $U_{a,j,sec}$.

The network side device determines second typical path loss values of channels between $U_{a,j,sec}$ and the secondary cells, that is, second typical channel state values of the channels between $U_{a,j,sec}$ and the secondary cells, according to $w_i'$ of each terminal in $U_{a,j,sec}$ and second path losses between each terminal in $U_{a,j,sec}$ and the secondary cells. The second typical path loss values of the channels between $U_{a,j,sec}$ and the secondary cells may be indicated as $PL_{a,j,sec}$, the second path loss may be indicated as $PL_{i,sec}$, and a formula for calculating $W_{a,j,sec}$ and $PL_{a,j,sec}$ is shown as follows:

$$W_{a,j,sec} = \sum_{i \in U_{a,j,sec}} w_i'$$

$$PL_{a,j,sec} = \left( \frac{1}{W_{a,j,sec}} \sum_{i \in U_{a,j,sec}} (w_i' \cdot PL_{j,sec}^{-1}) \right)^{-1}$$

Further, the network side device may obtain, by performing the step S10 to step S12, $PL_j$, $W_{a,j,1}$, $PL_{a,j,sec}$, and $W_{a,j,sec}$ that are corresponding to each type of channel state values in the cell a, as shown in Table 2. The service distribution in the cell a includes $PL_j$, $W_{a,j,1}$, $PL_{a,j,sec}$, and $W_{a,j,sec}$.

TABLE 2

| Channel state classification of a cell a | First typical channel state value of a channel and a first service volume between a terminal set and a primary cell | Second typical channel state values of channels and second service volumes between the terminal set and secondary cells |
| --- | --- | --- |
| The first type of channel state values | $(PL_1, W_{a,1,1})$ | $(PL_{a,1,sec}, W_{a,1,sec})$ |
| ... | ... | ... |
| The $j^{th}$ type of channel state values | $(PL_j, W_{a,j,1})$ | $(PL_{a,j,sec}, W_{a,j,sec})$ |
| ... | ... | ... |
| The $k^{th}$ type of channel state values | $(PL_k, W_{a,k,1})$ | $(PL_{a,k,sec}, W_{a,k,sec})$ |

Likewise, the network side device that serves the neighboring cells of the multiple terminals may obtain service distribution of the neighboring cells separately by performing step S501 to step S505.

In this embodiment of the present invention, service distribution obtained by a network side device is distribution of a service in a channel state. In the service distribution obtaining method provided in this embodiment of the present invention, channels between multiple terminals in one cell and a primary cell are measured, and the network side device classifies first channel state values that are of the channels between the multiple terminals and the primary cell and that are included in measurement information of the multiple terminals, and separately obtains a first typical channel state value of a channel and a first service volume between each type of first channel state values and the primary cell, so that the network side device obtains distribution of services of the multiple terminals in a channel state, that is, the network side device obtains service distribution in the serving cell of the multiple terminals. The service distribution provided in this embodiment of the present invention is obtained by measuring channels, classifying and calculating channel measurement results, collecting statistics on services transmitted on the channels, and the like. Therefore, compared with the prior art in which service distribution in a serving cell of multiple terminals is obtained according to geographical location information of the multiple terminals and services transmitted by the multiple terminals, in the service distribution obtaining method provided in this embodiment of the present invention, the network side device can obtain service distribution of all terminals in a network without affecting network efficiency.

Figure 8:
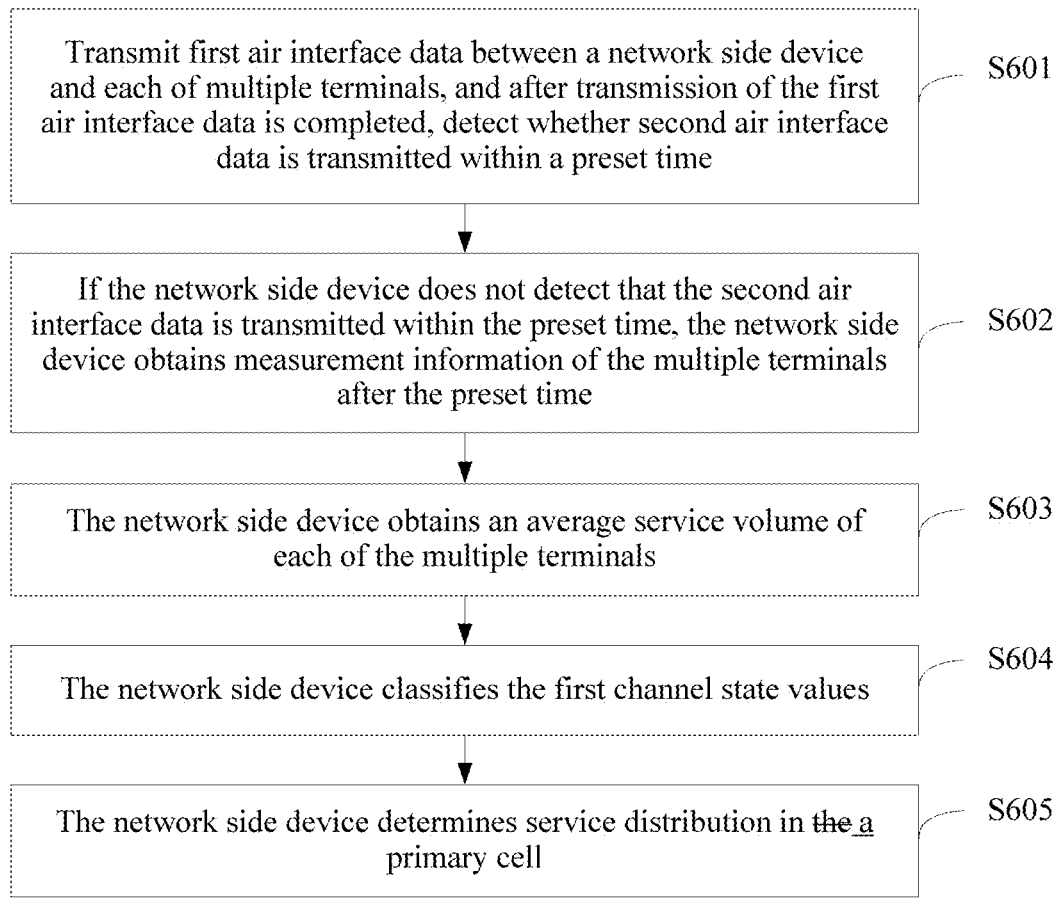
FIG. 8 is flowchart 6 of a service distribution obtaining method according to an embodiment of the present invention.

An embodiment of the present invention provides another service distribution obtaining method. As shown in FIG. 8, the method may include the following steps.

S601. Transmit first air interface data between a network side device and multiple terminals, and after transmission of the first air interface data is completed, detect whether second air interface data is transmitted within a preset time.

A meaning of the first air interface data is the same as a meaning of the first air interface data in the embodiment shown in FIG. 6. For details, refer to a related description in the embodiment shown in FIG. 6, and details are not described herein again.

S602. If the network side device does not detect that the second air interface data is transmitted within the preset time, the network side device obtains measurement information of the multiple terminals after the preset time, where the measurement information includes first channel state values of channels between the multiple terminals and a primary cell and second channel state values of channels between the multiple terminals and secondary cells, a serving cell of the multiple terminals is the primary cell, and the secondary cells are neighboring cells of the primary cell.

Specifically, a manner of obtaining measurement information of the multiple terminals by the network side device is similar to a manner of obtaining measurement information of the multiple terminals by the network side device in the embodiment shown in FIG. 6. A difference lies in that in this embodiment of the present invention, the multiple terminals are multiple terminals in the primary cell, that is, the primary cell is the serving cell of the multiple terminals, but in the embodiment shown in FIG. 6, the multiple terminals may be multiple terminals in the primary cell, or may be multiple terminals in one of the secondary cells.

S603. The network side device obtains an average service volume of each of the multiple terminals.

S604. The network side device classifies the first channel state values.

Specifically, for a manner of classifying the first channel state values by the network side device, refer to a related description in the embodiment shown in FIG. 2, and details are not described herein again.

S605. The network side device determines service distribution in the primary cell.

In this embodiment of the present invention, that the network side device determines service distribution in the primary cell may be specifically: the network side device determines second typical channel state values of channels between a terminal set corresponding to each type of the first channel state values and the secondary cells and second service volumes between the terminal set and the secondary cells according to the second channel state values and the average service volume of each terminal. The service distribution in the primary cell (that is, the serving cell of the multiple terminals) includes the second typical channel state values and the second service volumes. So far, the network side has obtained the service distribution in the primary cell.

Specifically, for a specific process of determining the second typical channel state values and the second service volumes by the network side device, refer to a related description in the embodiment shown in FIG. 3, and details are not described herein again.

In this embodiment of the present invention, service distribution obtained by a network side device is distribution of a service in a channel state. In another service distribution obtaining method provided in this embodiment of the present invention, channels between multiple terminals in one cell and a primary cell and channels between multiple terminals in the cell and secondary cells are measured, and a network side device classifies first channel state values that are of channels between the multiple terminals and the primary cell and that are included in measurement information of the multiple terminals, and separately obtains a second typical channel state value and a second service volume that are corresponding to each type of first channel state values, so that the network side device obtains distribution of services of the multiple terminals in a channel state, that is, the network side device obtains service distribution in the serving cell of the multiple terminals. The service distribution provided in this embodiment of the present invention is obtained by measuring channels, classifying and calculating channel measurement results, collecting statistics on services transmitted on the channels, and the like. Therefore, compared with the prior art in which service distribution in a serving cell of multiple terminals is obtained according to geographical location information of the multiple terminals and services transmitted by the multiple terminals, in the service distribution obtaining method provided in this embodiment of the present invention, the network side device can obtain service distribution of all terminals in a network without affecting network efficiency.

Further, the service distribution provided in this embodiment of the present invention may be widely applied to network technologies. For example, the service distribution provided in this embodiment of the present invention may be applied to a network optimization technology.

For example, it is assumed that a network side device that serves the foregoing primary cell optimizes network performance of the primary cell according to the service distribution in the primary cell and service distribution in the secondary cells. Specifically, after the network side device estimates impact on the network performance of the primary cell caused by an adjustment to a transmission parameter of a network in the primary cell, and estimates impact on network performance of the secondary cells caused by the adjustment to the transmission parameter of the network in the primary cell, according to the service distribution in the primary cell and the service distribution in the secondary cells, the network side device readjusts the transmission parameter of the network in the primary cell, so that an adjusted transmission parameter of the network in the primary cell can be suitable for service distribution of the multiple terminals in the primary cell. Therefore, the network performance of the primary cell can be improved, and an objective of optimizing the primary cell can be achieved.

Specifically, for example, if a transmit power of the primary cell needs to be optimized, the network side device that serves the primary cell may estimate, according to the service distribution in the primary cell, impact on transmission rates of the multiple terminals in the primary cell, that is, impact on a throughput rate of the primary cell, caused by different transmit powers of the primary cell, and estimate, according to the service distribution in the secondary cells, a degree of interference to service transmission of multiple terminals in the secondary cells by the different transmit powers of the primary cell. The network side device determines, according to the estimated impact on the throughput rate of the primary cell caused by the different transmit powers of the primary cell and the estimated degree of interference to the service transmission of the multiple terminals in the secondary cells by the different transmit powers of the primary cell, a transmit power that can lead to a relatively high throughput rate of the primary cell and a relatively low degree of interference to the service transmission of the multiple terminals in the secondary cells, and uses the transmit power as the transmit power of the primary cell, thereby completing optimization of the transmit power of the primary cell.

Further, the service distribution provided in this embodiment of the present invention is obtained by measuring channels, classifying and calculating channel measurement results, collecting statistics on services transmitted on the channels, and the like. Therefore, compared with service distribution obtained by using geographical location information of a terminal and a service transmitted by the terminal in the prior art, the service distribution provided in this embodiment of the present invention has higher precision. Therefore, in a network optimization technology, using the service distribution provided in this embodiment of the present invention as reference information for the network optimizing technology can make an adjusted transmission parameter of a network be more suitable for service distribution of multiple terminals in a primary cell, that is, an optimization effect of optimizing network performance of the primary cell according to the service distribution provided in this embodiment of the present invention is better.

Figure 9:
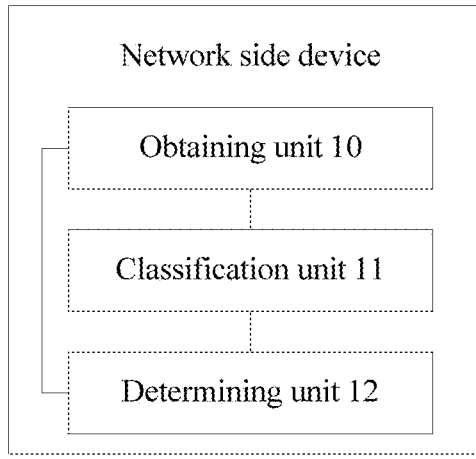
FIG. 9 is schematic structural diagram 1 of a network side device according to an embodiment of the present invention.

As shown in FIG. 9, an embodiment of the present invention provides a network side device. The network side device may include: an obtaining unit 10, configured to obtain measurement information of multiple terminals in a serving cell and an average service volume of each of the multiple terminals, where the measurement information includes first channel state values of channels between the multiple terminals and a primary cell, and the primary cell refers to the serving cell or one of neighboring cells of the serving cell; a classification unit 11, configured to classify the first channel state values obtained by the obtaining unit 10; and a determining unit 12, configured to determine service distribution, where the service distribution includes a first typical channel state value of each type of the first channel state values obtained by the classification unit 11 by means of classification and a first service volume between a terminal set corresponding to each type of the first channel state values and the primary cell, and the first service volume is determined according to the average service volume of each terminal that is obtained by the obtaining unit 10.

Optionally, the measurement information obtained by the obtaining unit 10 further includes second channel state values of channels between the multiple terminals and secondary cells, and the secondary cells are cells, other than the primary cell, in the serving cell and the neighboring cells.

The service distribution determined by the determining unit 12 further includes second typical channel state values of channels between the terminal set and the secondary cells and second service volumes between the terminal set and the secondary cells. The second typical channel state values are determined according to the second channel state values obtained by the obtaining unit 10, and the second service volumes are determined according to the average service volume of each terminal that is obtained by the obtaining unit 10.

Optionally, the network side device serves the primary cell, and the obtaining unit 10 is specifically configured to receive the measurement information sent by the multiple terminals.

Figure 10:
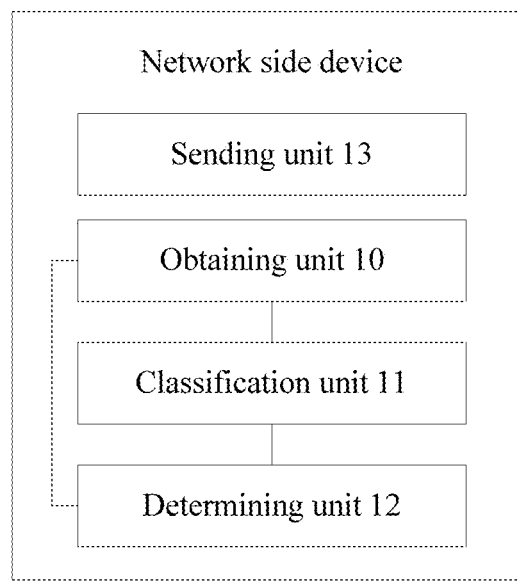
FIG. 10 is schematic structural diagram 2 of a network side device according to an embodiment of the present invention.

Optionally, with reference to FIG. 9, as shown in FIG. 10, the network side device serves the primary cell, and the network side device further includes: a sending unit 13, configured to: before the obtaining unit 10 receives the measurement information sent by the multiple terminals, send a downlink reference signal and a first measurement trigger instruction to the multiple terminals, where the first measurement trigger instruction is used to instruct the multiple terminals to measure the downlink reference signal.

Figure 11:
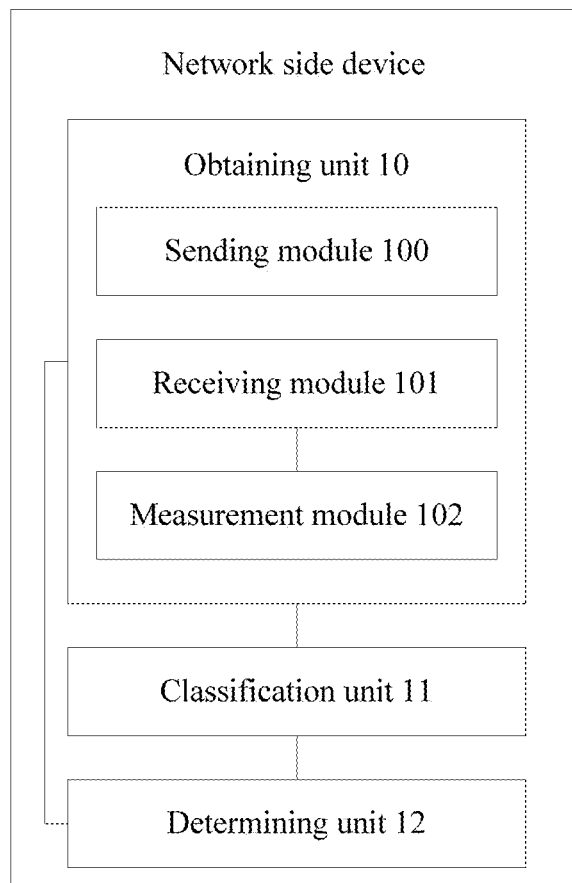
FIG. 11 is schematic structural diagram 3 of a network side device according to an embodiment of the present invention.

Optionally, with reference to FIG. 9, as shown in FIG. 11, the network side device serves the primary cell, and the obtaining unit 10 specifically includes a sending module 100, a receiving module 101, and a measurement module 102.

The sending module 100 is configured to send a second measurement trigger instruction to the multiple terminals, where the second measurement trigger instruction is used to instruct the multiple terminals to send uplink reference signals.

The receiving module 101 is configured to receive the uplink reference signals sent by the multiple terminals.

The measurement module 102 is configured to measure the uplink reference signals received by the receiving module 101, to obtain the measurement information.

Figure 12:
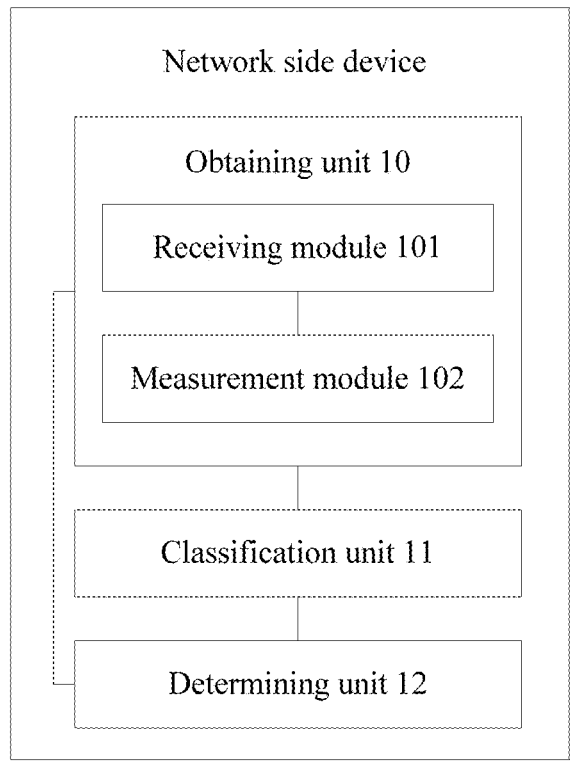
FIG. 12 is schematic structural diagram 4 of a network side device according to an embodiment of the present invention.

Optionally, with reference to FIG. 9, as shown in FIG. 12, the network side device serves the primary cell, and the obtaining unit 10 specifically includes a receiving module 101 and a measurement module 102.

The receiving module 101 is configured to receive third measurement trigger instructions and uplink reference signals that are separately sent by the multiple terminals, where the third measurement trigger instructions are used to: instruct the multiple terminals to send the uplink reference signals, and instruct the measurement module 102 to measure the uplink reference signals.

The measurement module 102 is configured to measure the uplink reference signals received by the receiving module 101, to obtain the measurement information.

Optionally, the network side device does not serve the primary cell, and the obtaining unit 10 is specifically configured to receive the measurement information sent by a network side device that serves the primary cell.

Optionally, as shown in FIG. 11, the measurement information obtained by the obtaining unit 10 includes first measurement information and second measurement information, where the first measurement information includes channel state values of channels between the multiple terminals and the serving cell, the second measurement information includes channel state values of channels between the multiple terminals and the neighboring cells, and the obtaining unit 10 specifically includes a sending module 100, a receiving module 101, and a measurement module 102.

The sending module 100 is configured to send a second measurement trigger instruction to the multiple terminals, where the second measurement trigger instruction is used to instruct the multiple terminals to send uplink reference signals.

The receiving module 101 is configured to receive the uplink reference signals sent by the multiple terminals and the second measurement information sent by a network side device that serves the neighboring cells.

The measurement module 102 is configured to measure the uplink reference signals received by the receiving module 101, to obtain the first measurement information.

Optionally, as shown in FIG. 12, the measurement information obtained by the obtaining unit 10 includes first measurement information and second measurement information, where the first measurement information includes channel state values of channels between the multiple terminals and the serving cell, the second measurement information includes channel state values of channels between the multiple terminals and the neighboring cells, and the obtaining unit 10 specifically includes a receiving module 101 and a measurement module 102.

The receiving module 101 is configured to receive third measurement trigger instructions that are respectively sent by the multiple terminals, uplink reference signals that are respectively sent by the multiple terminals, and the second measurement information sent by a network side device that serves the neighboring cells. The third measurement trigger instructions are used to: instruct the multiple terminals to send the uplink reference signals, and instruct the measurement module to measure the uplink reference signals.

The measurement module 102 is configured to measure the uplink reference signals received by the receiving module 101, to obtain the first measurement information.

Figure 13:
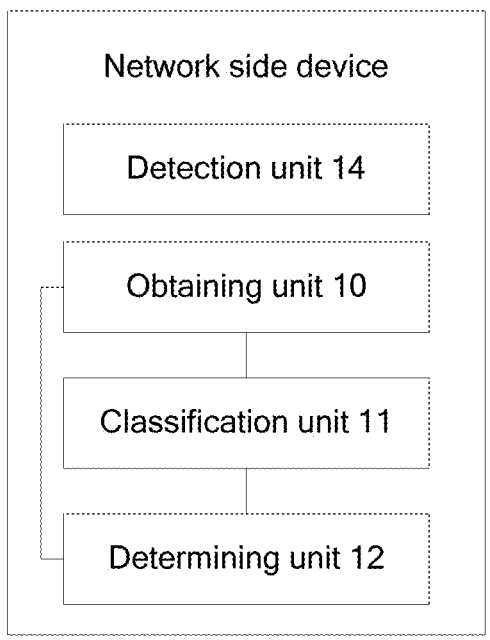
FIG. 13 is schematic structural diagram 5 of a network side device according to an embodiment of the present invention.

Optionally, as shown in FIG. 13, the network side device further includes: a detection unit 14, configured to: after transmission of first air interface data is completed, detect whether the network side device transmits second air interface data within a preset time.

The obtaining unit 10 is specifically configured to: if the detection unit 14 does not detect that the second air interface data is transmitted within the preset time, obtain the measurement information of the multiple terminals after the preset time.

Optionally, the third measurement trigger instruction received by the receiving module 101 is a synchronization request message, and the synchronization request message includes a indicator for requesting to send an uplink reference signal; or the third measurement trigger instruction received by the receiving module 101 is a synchronization instruction message, and the synchronization instruction message includes an uplink reference signal sending instruction and a sending timestamp.

It should be noted that the network side device provided in this embodiment of the present invention may be a base station, and the base station may be specifically an evolved NodeB (eNB).

The network side device provided in this embodiment of the present invention can measure channels between multiple terminals in a serving cell and a primary cell, can classify first channel state values that are of the channels between the multiple terminals and the primary cell and that are included in measurement information of the multiple terminals, and can separately obtain a first typical channel state value and a first service volume that are corresponding to each type of first channel state values, so as to obtain distribution of services of the multiple terminals in a channel state, that is, the network side device obtains service distribution in the serving cell of the multiple terminals. The network side device provided in this embodiment of the present invention obtains the service distribution in the serving cell of the multiple terminals by measuring channels, classifying and calculating channel measurement results, collecting statistics on services transmitted on the channels, and the like. Therefore, compared with the prior art in which service distribution in a serving cell of multiple terminals is obtained according to geographical location information of the multiple terminals and services transmitted by the multiple terminals, the network side device provided in this embodiment of the present invention can obtain service distribution of all terminals in a network without affecting network efficiency.

Figure 14:
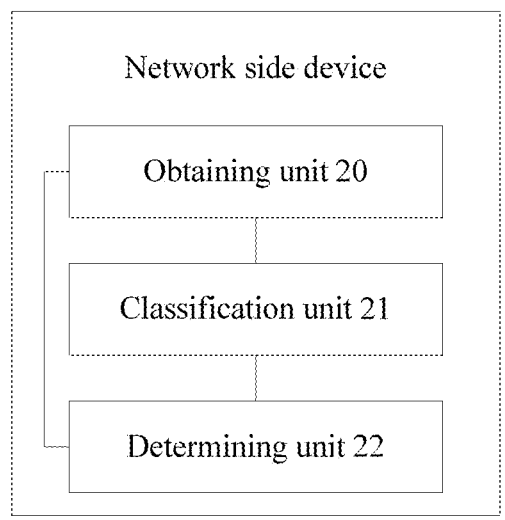
FIG. 14 is schematic structural diagram 1 of another network side device according to an embodiment of the present invention.

As shown in FIG. 14, an embodiment of the present invention provides another network side device. The network side device may include: an obtaining unit 20, configured to obtain measurement information of multiple terminals and an average service volume of each of the multiple terminals, where the measurement information includes first channel state values of channels between the multiple terminals and a primary cell and second channel state values of channels between the multiple terminals and secondary cells, a serving cell of the multiple terminals is the primary cell, and the secondary cells are neighboring cells of the primary cell; a classification unit 21, configured to classify the first channel state values obtained by the obtaining unit 20; and a determining unit 22, configured to determine service distribution, where the service distribution includes second typical channel state values of channels between a terminal set corresponding to each type of the first channel state values obtained by the classification unit 21 by means of classification and the secondary cells and second service volumes between the terminal set and the secondary cells, the second typical channel state values are determined according to the second channel state values obtained by the obtaining unit 20, and the second service volumes are determined according to the average service volume of each terminal that is obtained by the obtaining unit 20.

Optionally, the measurement information obtained by the obtaining unit 20 includes first measurement information and second measurement information, where the first measurement information includes the channel state values of the channels between the multiple terminals and the primary cell, the second measurement information includes the channel state values of the channels between the multiple terminals and the secondary cells, and the obtaining unit 20 is specifically configured to receive the first measurement information sent by the multiple terminals and the second measurement information sent by a network side device that serves the secondary cells.

Figure 15:
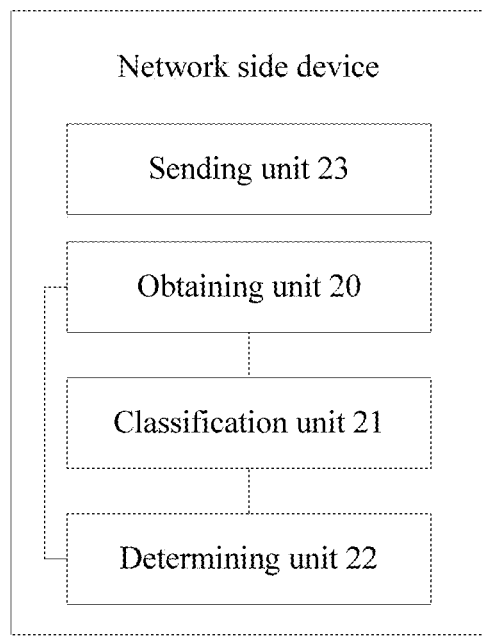
FIG. 15 is schematic structural diagram 2 of another network side device according to an embodiment of the present invention.

Optionally, with reference to FIG. 14, as shown in FIG. 15, the network side device further includes: a sending unit 23, configured to: before the obtaining unit 20 receives the first measurement information sent by the multiple terminals, send a downlink reference signal and a first measurement trigger instruction to the multiple terminals, where the first measurement trigger instruction is used to instruct the multiple terminals to measure the downlink reference signal.

Figure 16:
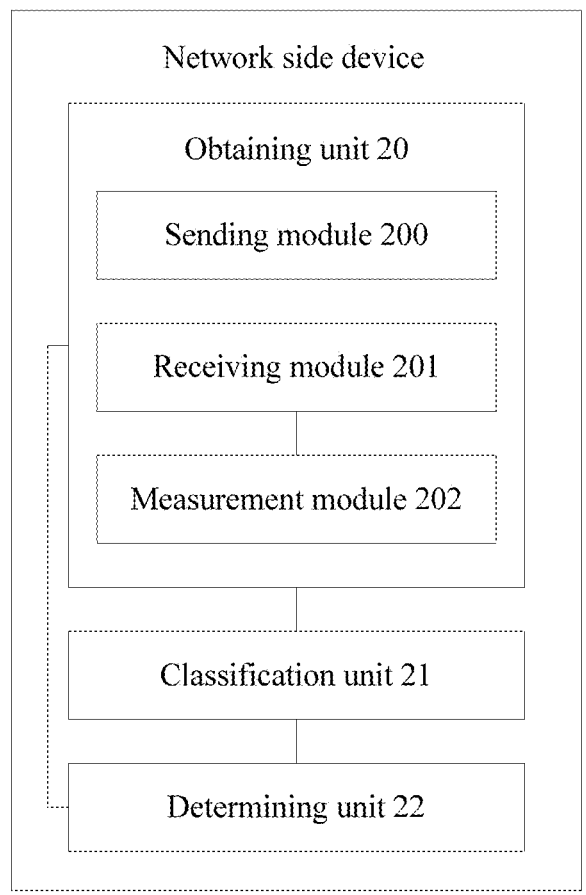
FIG. 16 is schematic structural diagram 3 of another network side device according to an embodiment of the present invention.

Optionally, with reference to FIG. 14, as shown in FIG. 16, the measurement information obtained by the obtaining unit 20 includes first measurement information and second measurement information, where the first measurement information includes the channel state values of the channels between the multiple terminals and the primary cell, the second measurement information includes the channel state values of the channels between the multiple terminals and the secondary cells, and the obtaining unit 20 specifically includes a sending module 200, a receiving module 201, and a measurement module 202.

The sending module 200 is configured to send a second measurement trigger instruction to the multiple terminals, where the second measurement trigger instruction is used to instruct the multiple terminals to send uplink reference signals.

The receiving module 201 is configured to receive the uplink reference signals sent by the multiple terminals and the second measurement information sent by a network side device that serves the secondary cells.

The measurement module 202 is configured to measure the uplink reference signals received by the receiving module 201, to obtain the first measurement information.

Figure 17:
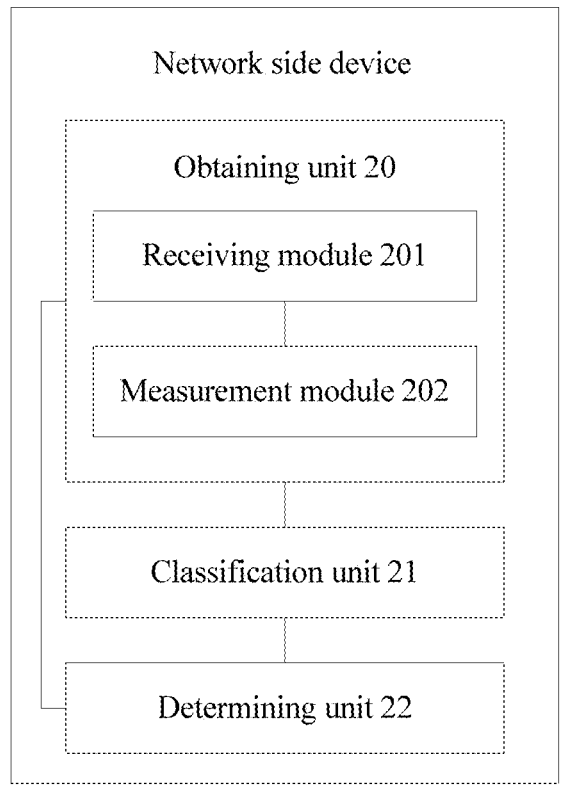
FIG. 17 is schematic structural diagram 4 of another network side device according to an embodiment of the present invention.

Optionally, with reference to FIG. 14, as shown in FIG. 17, the measurement information obtained by the obtaining unit 20 includes first measurement information and second measurement information, where the first measurement information includes the channel state values of the channels between the multiple terminals and the primary cell, the second measurement information includes the channel state values of the channels between the multiple terminals and the secondary cells, and the obtaining unit 20 specifically includes a receiving module 201 and a measurement module 202.

The receiving module 201 is configured to receive third measurement trigger instructions that are respectively sent by the multiple terminals, uplink reference signals sent by the multiple terminals, and the second measurement information sent by a network side device that serves the secondary cells. The third measurement trigger instructions are used to: instruct the multiple terminals to send the uplink reference signals, and instruct the measurement module 202 to measure the uplink reference signals.

The measurement module 202 is configured to measure the uplink reference signals received by the receiving module 201, to obtain the first measurement information.

Figure 18:
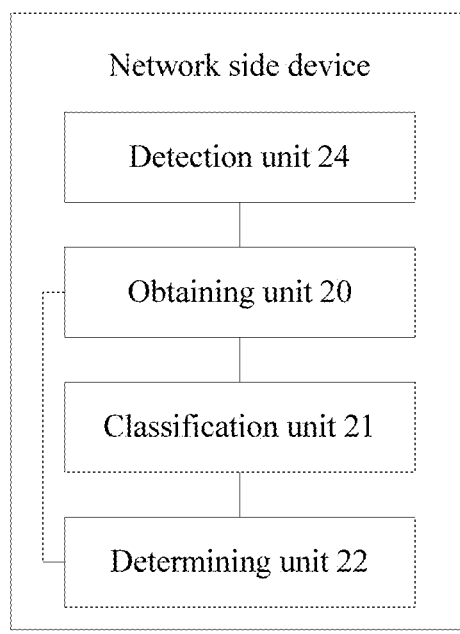
FIG. 18 is schematic structural diagram 5 of another network side device according to an embodiment of the present invention.

Optionally, with reference to FIG. 14, as shown in FIG. 18, the network side device further includes: a detection unit 24, configured to: after transmission of first air interface data is completed, detect whether the network side device transmits second air interface data within a preset time.

The obtaining unit 20 is specifically configured to: if the detection unit 24 does not detect that the second air interface data is transmitted within the preset time, obtain the measurement information of the multiple terminals after the preset time.

It should be noted that the network side device provided in this embodiment of the present invention may be a base station, and the base station may be specifically an evolved NodeB (eNB).

The network side device provided in this embodiment of the present invention can separately measure channels between multiple terminals in a serving cell and a primary cell and channels between the multiple terminals in the serving cell and secondary cells, classify first channel state values that are of the channels between the multiple terminals and the primary cell and that are included in measurement information of the multiple terminals, and separately obtain a second typical channel state value and a second service volume that are corresponding to each type of first channel state values, so as to obtain distribution of services of the multiple terminals in a channel state, that is, the network side device obtains service distribution in the serving cell of the multiple terminals. The network side device provided in this embodiment of the present invention obtains the service distribution in the serving cell of the multiple terminals by measuring channels, classifying and calculating channel measurement results, collecting statistics on services transmitted on the channels, and the like. Therefore, compared with the prior art in which service distribution in a serving cell of multiple terminals is obtained according to geographical location information of the multiple terminals and services transmitted by the multiple terminals, the network side device provided in this embodiment of the present invention can obtain service distribution of all terminals in a network without affecting network efficiency.

Figure 19:
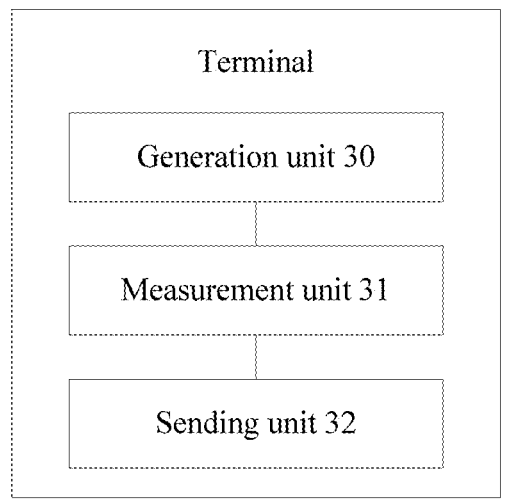
FIG. 19 is a schematic structural diagram of a terminal according to an embodiment of the present invention.

As shown in FIG. 19, an embodiment of the present invention provides a terminal. The terminal may include: a generation unit 30, configured to generate a terminal measurement trigger instruction, where the terminal measurement trigger instruction is used to instruct a measurement unit 31 to measure a received downlink reference signal; the measurement unit 31, configured to measure the downlink reference signal to obtain measurement information of the terminal; and a sending unit 32, configured to send, to a network side device, the measurement information of the terminal that is obtained by the measurement unit 31, so that the network side device obtains service distribution in a serving cell of the terminal according to the measurement information of the terminal and a service transmitted between the terminal and the serving cell, where the network side device serves the terminal.

It should be noted that the terminal provided in this embodiment of the present invention may include but is not limited to a personal computer, a laptop computer, a tablet computer, a netbook, a cellular phone, a handheld device, a cordless phone, a personal digital assistant (PDA), a mobile WiFi hotspot device (MiFi Device), a smart watch, smart glasses, a wireless modem, a wireless router, a wireless local loop (WLL) station, or the like.

The terminal provided in this embodiment of the present invention can generate a terminal measurement trigger instruction for instructing the terminal to measure a downlink reference signal received by the terminal, to obtain measurement information of the terminal, and send the measurement information to a network side device, so that the network side device obtains distribution of a service of the terminal in a channel state according to the measurement information of the terminal and the service that is transmitted between the terminal and a serving cell of the terminal, that is, the network side device obtains service distribution in the cell in which the terminal is located. Compared with service distribution in the prior art, the service distribution obtained according to the terminal provided in this embodiment of the present invention is obtained by measuring channels, classifying and calculating channel measurement results, collecting statistics on services transmitted on the channels, and the like. Therefore, according to the terminal provided in this embodiment of the present invention, the network side device can obtain service distribution of all terminals in a network without affecting network efficiency.

Figure 20:
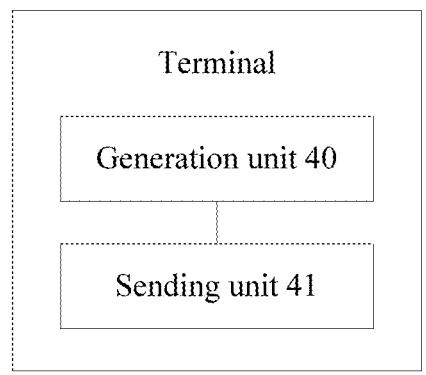
FIG. 20 is a schematic structural diagram of another terminal according to an embodiment of the present invention.

As shown in FIG. 20, an embodiment of the present invention provides another terminal. The terminal may include: a generation unit 40, configured to generate a network side measurement trigger instruction, where the network side measurement trigger instruction is used to: instruct a sending unit 41 to send an uplink reference signal to multiple network side devices, and instruct the multiple network side devices to measure the uplink reference signal, and the uplink reference signal is used by the multiple network side devices to obtain measurement information of the terminal, so as to obtain service distribution in a serving cell of the terminal according to the measurement information and a service transmitted between the terminal and the serving cell; and the sending unit 41, configured to send the network side measurement trigger instruction generated by the generation unit 40 and the uplink reference signal to the multiple network side devices.

Optionally, the network side measurement trigger instruction generated by the generation unit 40 is a synchronization request message, and the synchronization request message includes a indicator for requesting to send an uplink reference signal; or the network side measurement trigger instruction generated by the generation unit 40 is a synchronization instruction message, and the synchronization instruction message includes an uplink reference signal sending instruction and a sending timestamp.

It should be noted that the terminal provided in this embodiment of the present invention may include but is not limited to a personal computer, a laptop computer, a tablet computer, a netbook, a cellular phone, a handheld device, a cordless phone, a PDA, a mobile WiFi hotspot device, a smart watch, smart glasses, a wireless modem, a wireless router, a WLL station or the like.

The terminal provided in this embodiment of the present invention can generate a network side measurement trigger instruction to: instruct the terminal to send an uplink reference signal to multiple network side devices, and instruct the multiple network side devices to measure the uplink reference signal sent by the terminal, so that the network side device obtains measurement information of the terminal, and the network side device obtains distribution of a service of the terminal in a channel state according to the measurement information of the terminal and the service that is transmitted between the terminal and a serving cell of the terminal, that is, the network side device obtains service distribution in the cell in which the terminal is located. The service distribution obtained according to the terminal provided in this embodiment of the present invention is obtained by measuring channels, classifying and calculating channel measurement results, collecting statistics on services transmitted on the channels, and the like. Therefore, compared with the prior art in which service distribution in a serving cell of multiple terminals is obtained according to geographical location information of the multiple terminals and services transmitted by the multiple terminals, according to the terminal provided in this embodiment of the present invention, the network side device can obtain service distribution of all terminals in a network without affecting network efficiency.

Figure 21:
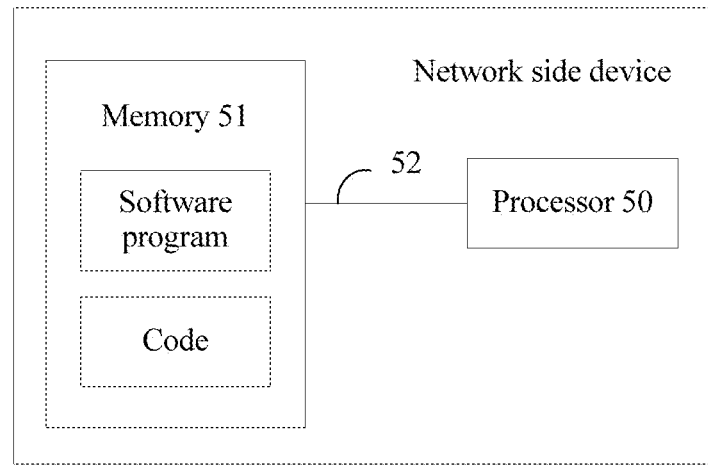
FIG. 21 is schematic diagram 1 of a hardware structure of a network side device according to an embodiment of the present invention.

As shown in FIG. 21, an embodiment of the present invention provides a network side device. The network side device may include a processor 50, a memory 51, and a system bus 52. The processor 50 and the memory 51 are connected and complete mutual communication by using the system bus 52.

The processor 50 may be a central processing unit (CPU), an application-specific integrated circuit (ASIC), or one or more integrated circuits that are configured to implement this embodiment of the present invention.

The memory 51 may include a volatile memory, for example, a random access memory (RAM); or the memory 51 may include a non-volatile memory, for example, a read-only memory (ROM), a flash memory, a hard disk drive (HDD), or a solid-state drive (SSD); or the memory 51 may include a combination of the foregoing types of memories.

When the network side device runs, the processor 50 and the memory 51 may execute the method procedure in FIG. 2 or FIG. 6. Details include the following.

The processor 50 is configured to: obtain measurement information of multiple terminals in a serving cell and an average service volume of each of the multiple terminals, classify first channel state values of channels between the multiple terminals and a primary cell, and determine service distribution, where the measurement information includes the first channel state values, the primary cell refers to the serving cell or one of neighboring cells of the serving cell, the service distribution includes a first typical channel state value of each type of the first channel state values and a first service volume between a terminal set corresponding to each type of the first channel state values and the primary cell, and the first service volume is determined according to the average service volume of each terminal. The memory 51 is configured to store the measurement information, the average service volume of each of the multiple terminals, the first channel state values, the service distribution, the first typical channel state value of each type of first channel state values, the first service volume, and a software program for controlling the processor 50 to complete the foregoing process, so that the processor 50 completes the foregoing process by executing the software program and using the measurement information, the average service volume of each of the multiple terminals, the first channel state value, the service distribution, the first typical channel state value of each type of first channel state values, and the first service volume.

Optionally, the measurement information obtained by the processor 50 further includes second channel state values of channels between the multiple terminals and secondary cells, the secondary cells are cells, other than the primary cell, in the serving cell and the neighboring cells, and the service distribution determined by the processor 50 further includes second typical channel state values of channels between the terminal set and the secondary cells and the second service volumes between the terminal set and the secondary cells. The second typical channel state values are determined according to the second channel state values, and the second service volumes are determined according to the average service volume of each terminal.

Optionally, the network side device serves the primary cell, and the processor 50 is specifically configured to receive the measurement information sent by the multiple terminals.

Figure 22:
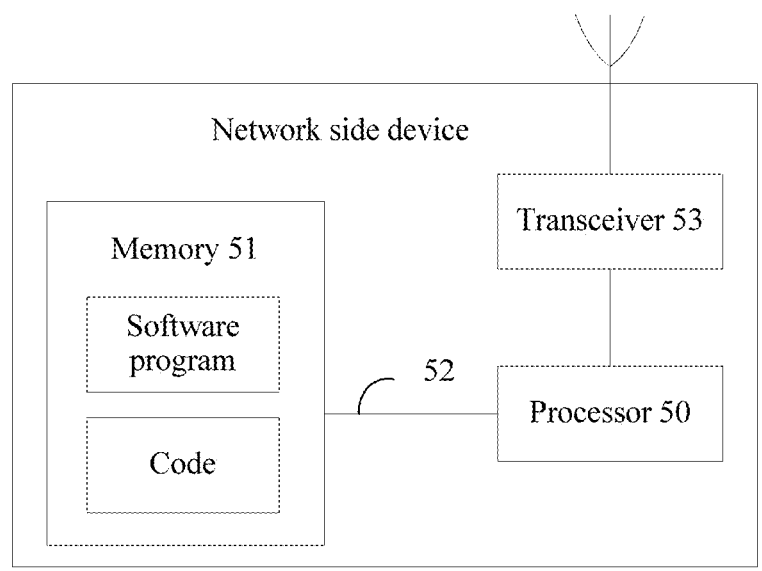
FIG. 22 is schematic diagram 2 of a hardware structure of a network side device according to an embodiment of the present invention.

Optionally, with reference to FIG. 21, as shown in FIG. 22, the network side device serves the primary cell, and the network side device further includes: a transceiver 53, configured to: before the processor 50 receives the measurement information sent by the multiple terminals, send a downlink reference signal and a first measurement trigger instruction to the multiple terminals, where the first measurement trigger instruction is used to instruct the multiple terminals to measure the downlink reference signal.

The transceiver 53 may be a module having an independent receiver and an independent transmitter, or may be a module that integrates a receiver and a transmitter.

Optionally, the network side device serves the primary cell, and the processor 50 is specifically configured to: send a second measurement trigger instruction to the multiple terminals, receive uplink reference signals sent by the multiple terminals, and measure the uplink reference signals to obtain the measurement information. The second measurement trigger instruction is used to instruct the multiple terminals to send the uplink reference signals.

Optionally, the network side device serves the primary cell, and the processor 50 is specifically configured to: receive third measurement trigger instructions and uplink reference signals that are separately sent by the multiple terminals, and measure the uplink reference signals to obtain the measurement information, where the third measurement trigger instructions are used to: instruct the multiple terminals to send the uplink reference signals, and instruct the processor to measure the uplink reference signals.

Optionally, the network side device does not serve the primary cell, and the processor 50 is specifically configured to receive the measurement information sent by a network side device that serves the primary cell.

Optionally, the measurement information obtained by the processor 50 includes first measurement information and second measurement information, where the first measurement information includes channel state values of channels between the multiple terminals and the serving cell, and the second measurement information includes channel state values of channels between the multiple terminals and the neighboring cells. The processor 50 is specifically configured to: send a second measurement trigger instruction to the multiple terminals, receive uplink reference signals sent by the multiple terminals and the second measurement information sent by a network side device that serves the neighboring cells, and measure the uplink reference signals to obtain the first measurement information. The second measurement trigger instruction is used to instruct the multiple terminals to send the uplink reference signals.

Optionally, the measurement information obtained by the processor 50 includes first measurement information and second measurement information, where the first measurement information includes channel state values of channels between the multiple terminals and the serving cell, and the second measurement information includes channel state values of channels between the multiple terminals and the neighboring cells. The processor 50 is specifically configured to: receive third measurement trigger instructions that are respectively sent by the multiple terminals, uplink reference signals that are respectively sent by the multiple terminals, and the second measurement information sent by a network side device that serves the neighboring cells, and measure the uplink reference signals to obtain the first measurement information, where the third measurement trigger instructions are used to: instruct the multiple terminals to send the uplink reference signals, and instruct the processor to measure the uplink reference signals.

Optionally, the processor 50 is specifically configured to: after transmission of first air interface data is completed, if the processor 50 does not detect that second air interface data is transmitted within a preset time, obtain the measurement information of the multiple terminals after the preset time.

Optionally, the third measurement trigger instruction received by the processor 50 is a synchronization request message, and the synchronization request message includes a indicator for requesting to send an uplink reference signal; or the third measurement trigger instruction received by the processor 50 is a synchronization instruction message, and the synchronization instruction message includes an uplink reference signal sending instruction and a sending timestamp.

The network side device provided in this embodiment of the present invention can measure channels between multiple terminals in a serving cell and a primary cell, can classify first channel state values that are of the channels between the multiple terminals and the primary cell and that are included in measurement information of the multiple terminals, and can separately obtain a first typical channel state value and a first service volume that are corresponding to each type of first channel state values, so as to obtain distribution of services of the multiple terminals in a channel state, that is, the network side device obtains service distribution in the serving cell of the multiple terminals. The network side device provided in this embodiment of the present invention obtains the service distribution in the serving cell of the multiple terminals by measuring channels, classifying and calculating channel measurement results, collecting statistics on services transmitted on the channels, and the like. Therefore, compared with the prior art in which service distribution in a serving cell of multiple terminals is obtained according to geographical location information of the multiple terminals and services transmitted by the multiple terminals, the network side device provided in this embodiment of the present invention can obtain service distribution of all terminals in a network without affecting network efficiency.

Figure 23:
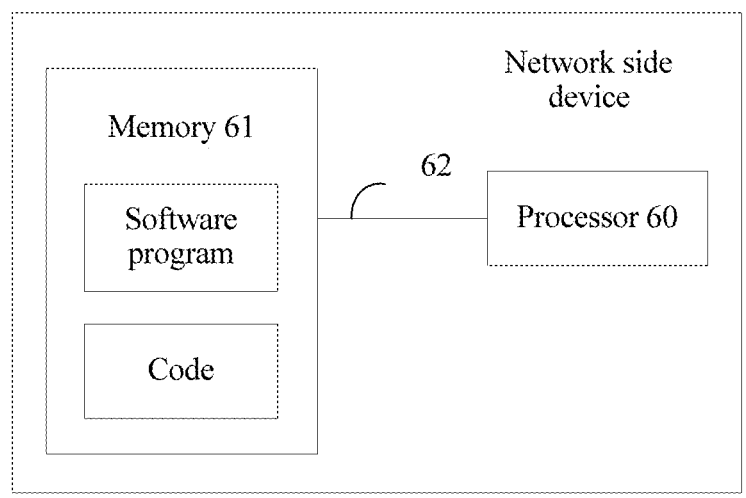
FIG. 23 is schematic diagram 1 of a hardware structure of another network side device according to an embodiment of the present invention.

As shown in FIG. 23, an embodiment of the present invention provides another network side device. The network side device may include a processor 60, a memory 61, and a system bus 62. The processor 60 and the memory 61 are connected and complete mutual communication by using the system bus 62.

The processor 60 may be a CPU, an ASIC, or one or more integrated circuits that are configured to implement this embodiment of the present invention.

The memory 61 may include a volatile memory, for example, a RAM; or the memory 61 may include a non-volatile memory, for example, a ROM, a flash memory, an HDD, or an SSD; or the memory 61 may include a combination of the foregoing types of memories.

When the network side device runs, the processor 60 and the memory 61 may execute the method procedure in FIG. 3 or FIG. 8. Details include the following:

The processor 60 is configured to: obtain measurement information of multiple terminals and an average service volume of each of the multiple terminals, classify first channel state values of channels between the multiple terminals and a primary cell, and determine service distribution, where the measurement information includes the first channel state values and second channel state values of channels between the multiple terminals and secondary cells, a serving cell of the multiple terminals is the primary cell, the secondary cells are neighboring cells of the primary cell, the service distribution includes second typical channel state values of channels between a terminal set corresponding to each type of the first channel state values and the secondary cells and second service volumes between the terminal set and the secondary cells, the second typical channel state values are determined according to the second channel state values, and the second service volumes are determined according to the average service volume of each terminal. The memory 61 is configured to store the measurement information, the average service volume of each of the multiple terminals, the service distribution, the first channel state values, the second channel state values, the second typical channel state values, the second service volumes, and a software program for controlling the processor 60 to complete the foregoing process, so that the processor 60 completes the foregoing process by executing the software program and using the measurement information, the average service volume of each of the multiple terminals, the service distribution, the first channel state values, the second channel state values, the second typical channel state values, and the second service volumes.

Optionally, the measurement information obtained by the processor 60 includes first measurement information and second measurement information, where the first measurement information includes the channel state values of the channels between the multiple terminals and the primary cell, and the second measurement information includes the channel state values of the channels between the multiple terminals and the secondary cells. The processor 60 is specifically configured to receive the first measurement information sent by the multiple terminals and the second measurement information sent by a network side device that serves the secondary cells.

Figure 24:
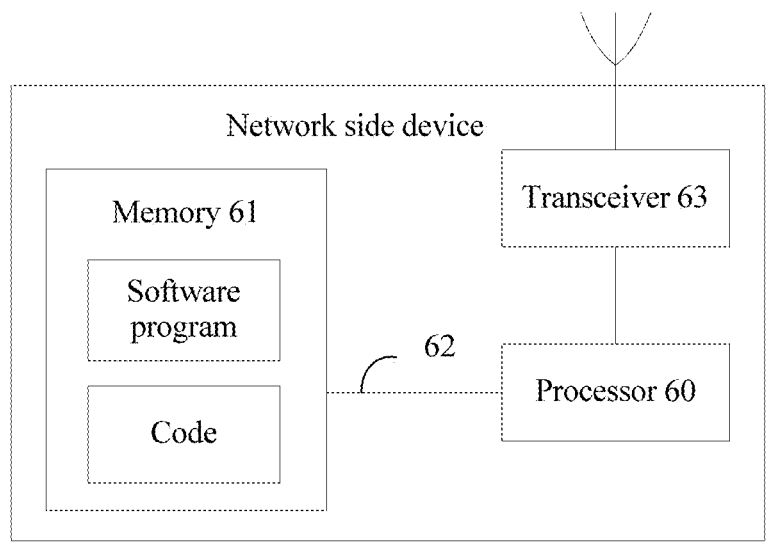
FIG. 24 is schematic diagram 2 of a hardware structure of another network side device according to an embodiment of the present invention.

Optionally, with reference to FIG. 23, as shown in FIG. 24, the network side device further includes: a transceiver 63, configured to: before the processor 60 receives the first measurement information sent by the multiple terminals, send a downlink reference signal and a first measurement trigger instruction to the multiple terminals, where the first measurement trigger instruction is used to instruct the multiple terminals to measure the downlink reference signal.

The transceiver 63 may be a module having an independent receiver and an independent transmitter, or may be a module that integrates a receiver and a transmitter.

Optionally, the measurement information obtained by the processor 60 includes first measurement information and second measurement information, where the first measurement information includes the channel state values of the channels between the multiple terminals and the primary cell, and the second measurement information includes the channel state values of the channels between the multiple terminals and the secondary cells. The processor 60 is specifically configured to: send a second measurement trigger instruction to the multiple terminals, receive uplink reference signals sent by the multiple terminals and the second measurement information sent by a network side device that serves the secondary cells, and measure the uplink reference signals to obtain the first measurement information. The second measurement trigger instruction is used to instruct the multiple terminals to send the uplink reference signals.

Optionally, the measurement information obtained by the processor 60 includes first measurement information and second measurement information, where the first measurement information includes the channel state values of the channels between the multiple terminals and the primary cell, and the second measurement information includes the channel state values of the channels between the multiple terminals and the secondary cells. The processor 60 is specifically configured to: receive third measurement trigger instructions that are respectively sent by the multiple terminals, uplink reference signals that are respectively sent by the multiple terminals, and the second measurement information sent by a network side device that serves the secondary cells, and measure the uplink reference signals to obtain the first measurement information. The third measurement trigger instructions are used to: instruct the multiple terminals to send the uplink reference signals, and instruct the processor 60 to measure the uplink reference signal.

Optionally, the processor 60 is specifically configured to: after transmission of first air interface data is completed, if the processor 60 does not detect that second air interface data is transmitted within a preset time, obtain the measurement information of the multiple terminals after the preset time.

The network side device provided in this embodiment of the present invention can separately measure channels between multiple terminals in a serving cell and a primary cell and channels between the multiple terminals in the serving cell and secondary cells, classify first channel state values that are of channels between the multiple terminals and the primary cell and that are included in measurement information of the multiple terminals, and separately obtain a second typical channel state value and a second service volume that are corresponding to each type of first channel state values, so as to obtain distribution of services of the multiple terminals in a channel state, that is, the network side device obtains service distribution in the serving cell of the multiple terminals. The network side device provided in this embodiment of the present invention obtains the service distribution in the serving cell of the multiple terminals by measuring channels, classifying and calculating channel measurement results, collecting statistics on services transmitted on the channels, and the like. Therefore, compared with the prior art in which service distribution in a serving cell of multiple terminals is obtained according to geographical location information of the multiple terminals and services transmitted by the multiple terminals, the network side device provided in this embodiment of the present invention can obtain service distribution of all terminals in a network without affecting network efficiency.

Figure 25:
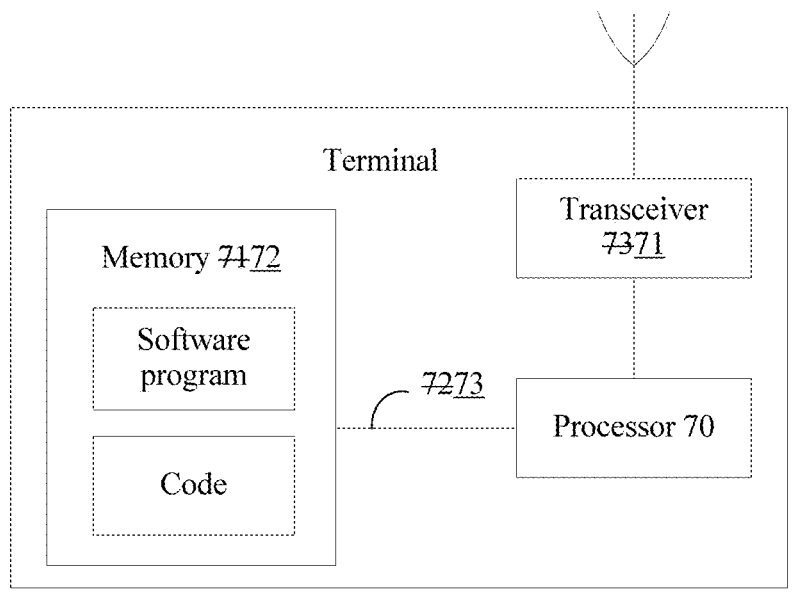
FIG. 25 is a schematic diagram of a hardware structure of a terminal according to an embodiment of the present invention.

As shown in FIG. 25, an embodiment of the present invention provides a terminal. The terminal may include a processor 70, a transceiver 71, a memory 72, and a system bus 73. The processor 70, the transceiver 71, and the memory 72 are connected and complete mutual communication by using the system bus 73.

The processor 70 may be a CPU, an ASIC, or one or more integrated circuits that are configured to implement this embodiment of the present invention.

The transceiver 71 may be a module having an independent receiver and an independent transmitter, or may be a module that integrates a receiver and a transmitter.

The memory 72 may include a volatile memory, for example, a RAM; or the memory 72 may include a non-volatile memory, for example, a ROM, a flash memory, an HDD, or an SSD; or the memory 72 may include a combination of the foregoing types of memories.

When the terminal runs, the processor 70, the transceiver 71, and the memory 72 may execute the method procedure in FIG. 4, FIG. 6, or FIG. 8. Details include the following:

The processor 70 is configured to: generate a terminal measurement trigger instruction, and measure a received downlink reference signal to obtain measurement information of the terminal, where the terminal measurement trigger instruction is used to instruct the processor 70 to measure the downlink reference signal. The transceiver 71 is configured to send, to a network side device, the measurement information of the terminal that is obtained by the processor 70, so that the network side device obtains service distribution in a serving cell of the terminal according to the measurement information of the terminal and a service transmitted between the terminal and the serving cell, where the network side device serves the terminal. The memory 72 is configured to store the terminal measurement trigger instruction, the measurement information of the terminal, the downlink reference signal, and a software program for controlling the processor 70 to complete the foregoing process, so that the processor 70 completes the foregoing process by executing the software program and using the terminal measurement trigger instruction, the measurement information of the terminal, and the downlink reference signal.

The terminal provided in this embodiment of the present invention can generate a terminal measurement trigger instruction for instructing the terminal to measure a downlink reference signal received by the terminal, to obtain measurement information of the terminal, and send the measurement information to a network side device, so that the network side device obtains distribution of a service of the terminal in a channel state according to the measurement information of the terminal and the service that is transmitted between the terminal and a serving cell of the terminal, that is, the network side device obtains service distribution in the cell in which the terminal is located. Compared with service distribution in the prior art, the service distribution obtained according to the terminal provided in this embodiment of the present invention is obtained by measuring channels, classifying and calculating channel measurement results, collecting statistics on services transmitted on the channels, and the like. Therefore, according to the terminal provided in this embodiment of the present invention, the network side device can obtain service distribution of all terminals in a network without affecting network efficiency.

Figure 26:
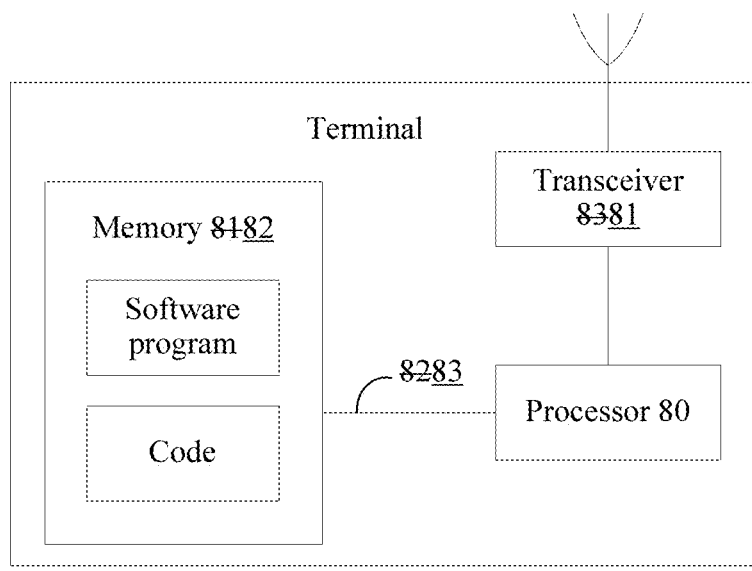
FIG. 26 is a schematic diagram of a hardware structure of another terminal according to an embodiment of the present invention.

As shown in FIG. 26, an embodiment of the present invention provides another terminal. The terminal may include a processor 80, a transceiver 81, a memory 82, and a system bus 83. The processor 80, the transceiver 81, and the memory 82 are connected and complete mutual communication by using the system bus 83.

The processor 80 may be a CPU, an ASIC, or one or more integrated circuits that are configured to implement this embodiment of the present invention.

The transceiver 81 may be a module having an independent receiver and an independent transmitter, or may be a module that integrates a receiver and a transmitter.

The memory 82 may include a volatile memory, for example, a RAM; or the memory 82 may include a non-volatile memory, for example, a ROM, a flash memory, an HDD, or an SSD; or the memory 82 may include a combination of the foregoing types of memories.

When the terminal runs, the processor 80, the transceiver 81, and the memory 82 may execute the method procedure in FIG. 5, FIG. 6, or FIG. 8. Details include the following:

The processor 80 generates a network side measurement trigger instruction. The network side measurement trigger instruction instructs the transceiver 81 to send an uplink reference signal to multiple network side devices, and instruct the multiple network side devices to measure the uplink reference signal, and the uplink reference signal is used by the multiple network side devices to obtain measurement information of the terminal, so as to obtain service distribution in a serving cell of the terminal according to the measurement information and a service transmitted between the terminal and the serving cell. The transceiver 81 is configured to send the network side measurement trigger instruction generated by the processor 80 and the uplink reference signal to the multiple network side devices. The memory 82 is configured to store the network side measurement trigger instruction, the uplink reference signal, and a software program for controlling the processor 80 to complete the foregoing process, so that the processor 80 completes the foregoing process by executing the software program and using the network side measurement trigger instruction and the uplink reference signal.

Optionally, the network side measurement trigger instruction generated by the processor 80 is a synchronization request message, and the synchronization request message includes a indicator for requesting to send an uplink reference signal; or the network side measurement trigger instruction generated by the processor 80 is a synchronization instruction message, and the synchronization instruction message includes an uplink reference signal sending instruction and a sending timestamp.

The terminal provided in this embodiment of the present invention can generate a network side measurement trigger instruction to: instruct the terminal to send an uplink reference signal to multiple network side devices, and instruct the multiple network side devices to measure the uplink reference signal sent by the terminal, so that the network side device obtains measurement information of the terminal, and the network side device obtains distribution of a service of the terminal in a channel state according to the measurement information of the terminal and the service that is transmitted between the terminal and a serving cell of the terminal, that is, the network side device obtains service distribution in the cell in which the terminal is located. The service distribution obtained according to the terminal provided in this embodiment of the present invention is obtained by measuring channels, classifying and calculating channel measurement results, collecting statistics on services transmitted on the channels, and the like. Therefore, compared with the prior art in which service distribution in a serving cell of multiple terminals is obtained according to geographical location information of the multiple terminals and services transmitted by the multiple terminals, according to the terminal provided in this embodiment of the present invention, the network side device can obtain service distribution of all terminals in a network without affecting network efficiency.

As shown in FIG. 1, an embodiment of the present invention provides a communications system, and the communications system may include: any network side device shown in FIG. 9 to FIG. 13 and multiple terminals shown in FIG. 19 or multiple terminals shown in FIG. 20; or any network side device shown in FIG. 14 to FIG. 18 and multiple terminals shown in FIG. 19 or multiple terminals shown in FIG. 20; or any network side device shown in FIG. 21 and FIG. 22 and multiple terminals shown in FIG. 25 or multiple terminals shown in FIG. 26; or any network side device shown in FIG. 23 and FIG. 24 and multiple terminals shown in FIG. 25 or multiple terminals shown in FIG. 26.

In this embodiment of the present invention, when a communications system provided in this embodiment of the present invention includes any network side device shown in FIG. 9 to FIG. 13 and multiple terminals shown in FIG. 19 or multiple terminals shown in FIG. 20, or when a communications system provided in this embodiment of the present invention includes any network side device shown in FIG. 21 and FIG. 22 and multiple terminals shown in FIG. 25 or multiple terminals shown in FIG. 26, the network side device in the communications system provided in this embodiment of the present invention can obtain measurement information of multiple terminals in a serving cell and an average service volume of each of the multiple terminals, classify first channel state values of channels between the multiple terminals and a primary cell, and determine service distribution in the serving cell. The measurement information includes the first channel state values, the primary cell refers to the serving cell or one of neighboring cells of the serving cell, the service distribution in the serving cell includes a first typical channel state value of each type of the first channel state values and a first service volume between a terminal set corresponding to each type of the first channel state values and the primary cell, and the first service volume is determined according to the average service volume of each terminal.

Service distribution obtained by using the communications system provided in this embodiment of the present invention is obtained by measuring channels, classifying and calculating channel measurement results, collecting statistics on services transmitted on the channels, and the like. Therefore, compared with the prior art in which service distribution in a serving cell of the multiple terminals is obtained according to geographical location information of the multiple terminals and services transmitted by the multiple terminals, the communications system provided in this embodiment of the present invention can obtain service distribution of all terminals in a network without affecting network efficiency.

In this embodiment of the present invention, when a communications system provided in this embodiment of the present invention includes any network side device shown in FIG. 14 to FIG. 18 and multiple terminals shown in FIG. 19 or multiple terminals shown in FIG. 20, or when a communications system provided in this embodiment of the present invention includes any network side device shown in FIG. 23 and FIG. 24 and multiple terminals shown in FIG. 25 or multiple terminals shown in FIG. 26, the network side device in the communications system provided in this embodiment of the present invention can obtain measurement information of multiple terminals and an average service volume of each of the multiple terminals, classify first channel state values of channels between the multiple terminals and a primary cell, and determine service distribution in the primary cell. The measurement information includes the first channel state values and second channel state values of channels between the multiple terminals and secondary cells. A serving cell of the multiple terminals is the primary cell, and the secondary cells are neighboring cells of the primary cell. The service distribution in the primary cell includes second typical channel state values of channels between a terminal set corresponding to each type of the first channel state values and the secondary cells and second service volumes between the terminal set and the secondary cells. The second typical channel state values are determined according to the second channel state values, and the second service volumes are determined according to the average service volume of each terminal.

Service distribution obtained by using the communications system provided in this embodiment of the present invention is obtained by measuring channels, classifying and calculating channel measurement results, collecting statistics on services transmitted on the channels, and the like. Therefore, compared with the prior art in which service distribution in a serving cell of multiple terminals is obtained according to geographical location information of the multiple terminals and services transmitted by the multiple terminals, the communications system provided in this embodiment of the present invention can obtain service distribution of all terminals in a network without affecting network efficiency.

It may be clearly understood by a person skilled in the art that for the purpose of convenient and brief description, division of the foregoing function modules is taken as an example for illustration. In an actual application, the foregoing functions can be allocated to different function modules and implemented according to a requirement, that is, an inner structure of an apparatus is divided into different function modules to implement all or some of the functions described above. For detailed working processes of the foregoing system, apparatus, and unit, refer to corresponding processes in the foregoing method embodiments, and details are not described herein.

In the embodiments provided in this application, it should be understood that the disclosed system, apparatus, and method may be implemented in other manners. For example, the described apparatus embodiment is only an example. For example, the module or unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located at one place, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more than two units may be integrated into one unit. The integrated unit may be implemented in a form of hardware, or may be implemented in a form of a software functional unit.

When being implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes instructions for instructing a computer device (which may be a personal computer, a server, or a network device) or a processor to perform all or some of the steps of the methods described in the embodiments of the present invention. The foregoing storage medium includes any medium that can store program code, such as a USB flash drive, a removable hard disk, a ROM, a RAM, a magnetic disk, or an optical disc.

The foregoing descriptions are only specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
    obtaining, by a network side device, measurement information of a plurality of terminals in a serving cell, wherein the measurement information comprises a plurality of first channel state values of a plurality of first channels, each of the plurality of first channels is between a respective terminal of the plurality of terminals and a primary cell, the primary cell is the serving cell or a neighboring cell of one or more neighboring cells of the serving cell, and wherein each first channel state value of the plurality of first channel state values is a ratio of a power of sending a respective uplink reference signal by a respective terminal corresponding to the respective first channel state value to a power of receiving the respective uplink reference signal by the primary cell, or is a ratio of a power of sending a respective downlink reference signal by the primary cell to a power of receiving the respective downlink reference signal by the respective terminal corresponding to the respective first channel state value;
    obtaining, by the network side device, an average service volume of each of the plurality of terminals;
    classifying, by the network side device, the plurality of first channel state values into a plurality of types, wherein, for each of the plurality of types, a respective terminal set comprising one or more terminals of the plurality of terminals corresponds to the respective type; and
    determining, by the network side device, service distribution, wherein the service distribution comprises, for each of the plurality of types, a first typical channel state value of the respective type and a first service volume between the respective terminal set corresponding to the respective type and the primary cell, and, for each type, the first service volume between the respective terminal set corresponding to the respective type and the primary cell is determined according to the average service volume of each terminal in the respective terminal set corresponding to the respective type.

2. The method according to claim 1, wherein the measurement information further comprises a plurality of second channel state values of a plurality of second channels, each of the plurality of second channels is between a respective terminal of the plurality of terminals and a respective secondary cell of one or more secondary cells, each of the one or more secondary cells is a respective cell, other than the primary cell, in a group of cells comprising the serving cell and the one or more neighboring cells of the serving cell, and the service distribution further comprises:
    for each type of the plurality of types, a second typical channel state value of the respective type and a second service volume between the respective terminal set corresponding to the respective type and respective one or more secondary cells corresponding to the respective one or more terminals in the respective terminal set, wherein, for each type, the second typical channel state value corresponding to the respective type is determined by the network side device according to one or more second channel state values of the plurality of second channel state values that correspond to the respective type, and the second service volume corresponding to the respective type is determined by the network side device according to the average service volume of each terminal in the respective terminal set corresponding to the respective type.

3. The method according to claim 2, wherein the measurement information comprises first measurement information and second measurement information, the first measurement information comprises channel state values of channels between the plurality of terminals and the serving cell, and the second measurement information comprises channel state values of channels between the plurality of terminals and the one or more neighboring cells; and wherein obtaining the measurement information of the plurality of terminals comprises:

sending, by the network side device, a second measurement trigger instruction to the plurality of terminals, wherein the second measurement trigger instruction instructs the plurality of terminals to send uplink reference signals;

receiving, by the network side device, the uplink reference signals sent by the plurality of terminals;

measuring, by the network side device, the uplink reference signals to obtain the first measurement information; and receiving, by the network side device, the second measurement information sent by another network side device that serves the one or more neighboring cells.

4. The method according to claim 2, wherein the measurement information comprises first measurement information and second measurement information, the first measurement information comprises channel state values of channels between the plurality of terminals and the serving cell, and the second measurement information comprises channel state values of channels between the plurality of terminals and the one or more neighboring cells; and wherein obtaining the measurement information of the plurality of terminals comprises:

receiving, by the network side device, third measurement trigger instructions that are respectively sent by the plurality of terminals, wherein the third measurement trigger instructions instruct the plurality of terminals to send uplink reference signals, and instruct the network side device to measure the uplink reference signals sent by the plurality of terminals;

receiving, by the network side device, the uplink reference signals sent by the plurality of terminals;

measuring, by the network side device, the uplink reference signals to obtain the first measurement information; and receiving, by the network side device, the second measurement information sent by a another network side device that serves the one or more neighboring cells.

5. The method according to claim 1, wherein the network side device serves the primary cell; and wherein obtaining the measurement information of the plurality of terminals comprises:

receiving, by the network side device, the measurement information sent by the plurality of terminals.

6. The method according to claim 5, wherein the network side device serves the primary cell, and before receiving the measurement information sent by the plurality of terminals, the method further comprises:

sending, by the network side device, a downlink reference signal to the plurality of terminals; and sending, by the network side device, a first measurement trigger instruction to the plurality of terminals, wherein the first measurement trigger instruction instructs the plurality of terminals to measure the downlink reference signal.

7. The method according to claim 1, wherein the network side device serves the primary cell, and obtaining, by the network side device, measurement information of the plurality of terminals comprises:

sending, by the network side device, a second measurement trigger instruction to the plurality of terminals, wherein the second measurement trigger instruction instructs the plurality of terminals to send uplink reference signals;

receiving, by the network side device, the uplink reference signals sent by the plurality of terminals; and measuring, by the network side device, the uplink reference signals to obtain the measurement information.

8. The method according to claim 1, wherein the network side device serves the primary cell, and obtaining the measurement information of the plurality of terminals comprises:

receiving, by the network side device, third measurement trigger instructions that are respectively sent by the plurality of terminals, wherein the third measurement trigger instructions instruct the plurality of terminals to send uplink reference signals, and instruct the network side device to measure the uplink reference signals sent by the plurality of terminals;

receiving, by the network side device, the uplink reference signals sent by the plurality of terminals; and measuring, by the network side device, the uplink reference signals to obtain the measurement information.

9. The method according to claim 8, wherein the third measurement trigger instruction is a synchronization request message, and the synchronization request message comprises a indicator for requesting to send an uplink reference signal; or wherein the third measurement trigger instruction is a synchronization instruction message, and the synchronization instruction message comprises an uplink reference signal sending instruction and a sending timestamp.

10. A network side device, comprising:

a processor, configured to:

obtain measurement information of a plurality of terminals in a serving cell, wherein the measurement information comprises a plurality of first channel state values of a plurality of first channels, each of the plurality of first channels is between a respective terminal of the plurality of terminals and a primary cell, the primary cell is the serving cell or a neighboring cell of one or more neighboring cells of the serving cell, and wherein each first channel state value of the plurality of first channel state values is a ratio of a power of sending a respective uplink reference signal by a respective terminal corresponding to the respective first channel state value to a power of receiving the respective uplink reference signal by the primary cell, or is a ratio of a power of sending a respective downlink reference signal by the primary cell to a power of receiving the respective downlink reference signal by the respective terminal corresponding to the respective first channel state value;

obtain an average service volume of each of the plurality of terminals; and classify the plurality of first channel state values of channels into a plurality of types, wherein, for each of the plurality of types, a respective terminal set comprising one or more terminals of the plurality of terminals corresponds to the respective type; and determine service distribution, wherein the service distribution comprises, for each type of the plurality of types, a first typical channel state value of the respective type and a first service volume between the respective terminal set corresponding to the respective type and the primary cell, and, for each type, the first service volume between the respective terminal set corresponding to the respective type and the primary cell is determined according to the average service volume of each terminal in the respective terminal set corresponding to the respective type.

11. The network side device according to claim 10, wherein the measurement information further comprises a plurality of second channel state values of a plurality of second channels, each of the plurality of second channels is between a respective terminal of the plurality of terminals and a respective secondary cell of one or more secondary cells, each of the one or more secondary cells is a respective cell, other than the primary cell, in a group of cells comprising the serving cell and the one or more neighboring cells of the serving cell, and the service distribution determined by the processor further comprises:

for each type of the plurality of types, a second typical channel state value of the respective type and a second service volume between the respective terminal set corresponding to the respective type and respective one or more secondary cells corresponding to the respective one or more terminals comprised in the respective terminal set, wherein, for each type, the second typical channel state value corresponding to the respective type is determined according to one or more second channel state values of the plurality of second channel state values that correspond to the respective type, and the second service volume corresponding to the respective type is determined according to the average service volume of each terminal in the respective terminal set corresponding to the respective type.

12. The network side device according to claim 11, wherein the measurement information comprises first measurement information and second measurement information, the first measurement information comprises channel state values of channels between the plurality of terminals and the serving cell, and the second measurement information comprises channel state values of channels between the plurality of terminals and the one or more neighboring cells; and wherein the processor is configured to send a second measurement trigger instruction to the plurality of terminals, receive uplink reference signals sent by the plurality of terminals and the second measurement information sent by another network side device that serves the one or more neighboring cells, and measure the uplink reference signals to obtain the first measurement information, wherein the second measurement trigger instruction instructs the plurality of terminals to send the uplink reference signals.

13. The network side device according to claim 11, wherein the measurement information comprises first measurement information and second measurement information, the first measurement information comprises channel state values of channels between the plurality of terminals and the serving cell, and the second measurement information comprises channel state values of channels between the plurality of terminals and the one or more neighboring cells; and wherein the processor is configured to receive third measurement trigger instructions that are respectively sent by the plurality of terminals, uplink reference signals that are respectively sent by the plurality of terminals, and the second measurement information sent by another network side device that serves the one or more neighboring cells, and measure the uplink reference signals to obtain the first measurement information, wherein the third measurement trigger instructions instruct the plurality of terminals to send the uplink reference signals, and instruct the processor to measure the uplink reference signals.

14. The network side device according to claim 10, wherein the network side device serves the primary cell; and wherein the processor is configured to send a second measurement trigger instruction to the plurality of terminals, receive uplink reference signals sent by the plurality of terminals, and measure the uplink reference signals to obtain the measurement information, wherein the second measurement trigger instruction instructs the plurality of terminals to send the uplink reference signals.

15. The network side device according to claim 10, wherein the network side device serves the primary cell; and wherein the processor is configured to: receive third measurement trigger instructions and uplink reference signals that are separately sent by the plurality of terminals, and measure the uplink reference signals to obtain the measurement information, wherein the third measurement trigger instructions instruct the plurality of terminals to send the uplink reference signals, and instruct the processor to measure the uplink reference signals.

16. The network side device according to claim 15, wherein the third measurement trigger instruction received by the processor is a synchronization request message, and the synchronization request message comprises a indicator for requesting to send an uplink reference signal; or wherein the third measurement trigger instruction received by the processor is a synchronization instruction message, and the synchronization instruction message comprises an uplink reference signal sending instruction and a sending timestamp.

17. The method according to claim 1, wherein, for each of the plurality of types, the terminal set corresponding to the respective type comprises one or more terminals that each correspond to a respective first channel state value that is classified into the respective type.

18. The network side device according to claim 10, wherein, for each of the plurality of types, the terminal set corresponding to the respective type comprises one or more terminals that each correspond to a respective first channel state value that is classified into the respective type.

* * * * *